United States Patent
Ebihara

(10) Patent No.: US 8,674,586 B2
(45) Date of Patent: Mar. 18, 2014

(54) MOTOR DEVICE, APPARATUS AND DRIVING METHOD FOR ROTOR

(75) Inventor: Akimitsu Ebihara, Osaka (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 12/654,546

(22) Filed: Dec. 22, 2009

(65) Prior Publication Data

US 2010/0164326 A1 Jul. 1, 2010

Related U.S. Application Data

(60) Provisional application No. 61/202,371, filed on Feb. 23, 2009.

(30) Foreign Application Priority Data

Dec. 26, 2008 (JP) ................. P2008-333925

(51) Int. Cl.
*H02N 2/04* (2006.01)
*H02N 2/10* (2006.01)

(52) U.S. Cl.
CPC .................... *H02N 2/101* (2013.01)
USPC .................... 310/328; 310/323.04

(58) Field of Classification Search
CPC ..................................... H02N 2/101
USPC ............... 310/323.01–323.21, 328
See application file for complete search history.

(56) References Cited

U.S. PATENT DOCUMENTS 6,940,210 B2* 9/2005 Karrai et al. .......... 310/328

2003/0052575 A1 3/2003 Mock et al.
2004/0140736 A1* 7/2004 Richter .......... 310/328
2006/0119225 A1* 6/2006 Heim et al. .......... 310/339

FOREIGN PATENT DOCUMENTS

| EP | 1 234 346 B1 | 8/2002 |
| JP | 2-261073 | 10/1990 |
| JP | 2-311237 | 12/1990 |
| JP | 7-168286 | 7/1995 |
| JP | 2003-516100 | 5/2003 |

OTHER PUBLICATIONS

International Search Report mailed Apr. 6, 2010 in corresponding International Patent Application PCT/JP2009/007192.
International Written Opinion mailed Apr. 6, 2010 in corresponding International Patent Application PCT/JP2009/007192.
Sang-Chae Kim et al., "Precise rotary by inchworm motion using dual wrap belts"; Review of Scientific Instruments; vol. 70, No. 5; May 1999; pp. 2546-2550.
Chinese Office Action issued Jul. 1, 2013 in Chinese Patent Application No. 200980152249.1.
Japanese Notice of Reasons for Rejection mailed Jan. 7, 2014 in Japanese Application No. 2010-543886.

* cited by examiner

*Primary Examiner* — Derek Rosenau
(74) *Attorney, Agent, or Firm* — Staas & Halsey LLP

(57) ABSTRACT

A motor device includes a rotor, a transmission member wound around at least a portion of an outer periphery of the rotor, a moving part connected to the transmission member to move the transmission member, and a control unit which makes the moving part perform the driving operation of moving the transmission member by a predetermined distance in a state where a torque transmission state is brought between the rotor and the transmission member, and the returning operation of returning the transmission member to a predetermined position in a state where the torque transmission state is released.

49 Claims, 18 Drawing Sheets

MOTOR DEVICE, APPARATUS AND DRIVING METHOD FOR ROTOR

CROSS-REFERENCE TO RELATED APPLICATION

This application is a non-provisional application claiming priority to and the benefit of U.S. provisional application No. 61/202,371, filed Feb. 23, 2009, and claims priority to Japanese Patent Application No. 2008-333925 filed on Dec. 26, 2008. The entire contents of which are incorporated herein by reference.

BACKGROUND

1. Field of the Invention

The present invention relates to a motor device, an apparatus, and a driving method for a rotor.

2. Description of Related Art

For example, a motor device is used as an actuator which drives a turning machine (e.g., Japanese Patent Application Publication No. H02-311237A). As such a motor device, for example, a motor device, such as an electric motor or an ultrasonic motor, which can generate high torque is widely known. In recent years, a motor device which drives a more precise portion, such as a joint part of a humanoid robot (an apparatus), has been required, as well as a configuration in which such a miniaturized motor can perform minute and high precision driving such as torque control as an existing motor; an electric motor or an ultrasonic motor.

SUMMARY

However, in the electric motor or the ultrasonic motor, since it is necessary to use a speed reducer in order to generate high torque, there is a limit to miniaturization. Additionally, in the ultrasonic motor, the control of torque is difficult.

A purpose of some aspects of the present invention is to provide a motor device suitable for miniaturization, and capable of generating high torque, and easily performing torque control.

An aspect of the invention provides a motor device that includes a rotor, a transmission member wound around at least a portion of an outer periphery of the rotor, a moving part connected to the transmission member to move the transmission member, and a control unit which makes the moving part perform a driving operation of moving the transmission member by a predetermined distance in a state where a torque transmission state is brought between the rotor and the transmission member, and a returning operation of returning the transmission member to a predetermined position in a state where the torque transmission state is released.

An another aspect of the invention provides a motor device that includes a rotor, a transmission member wound around the rotor, and a control unit which makes a vibrational wave propagate in one direction of the transmission member, and makes the transmission member perform a wavelike motion, thereby rotating the rotor in a direction opposite to the one direction.

An another aspect of the invention provides a driving method of a rotor that includes a driving step of moving a transmission member by a predetermined distance in a state where a torque transmission state is brought between the rotor and the transmission member wound around the rotor, and a returning step of returning the transmission member to a predetermined position where the torque transmission state is released.

An another aspect of the invention provides an apparatus that includes an arm portion; and a motor device according to the above-described aspect that drives the arm portion.

According to some aspects of the invention, it is possible to provide a motor device suitable for miniaturization, and capable of generating high torque.

DESCRIPTION OF EMBODIMENTS

Embodiments of the invention will be described below with reference to the drawings.

First Embodiment

Figure 1:
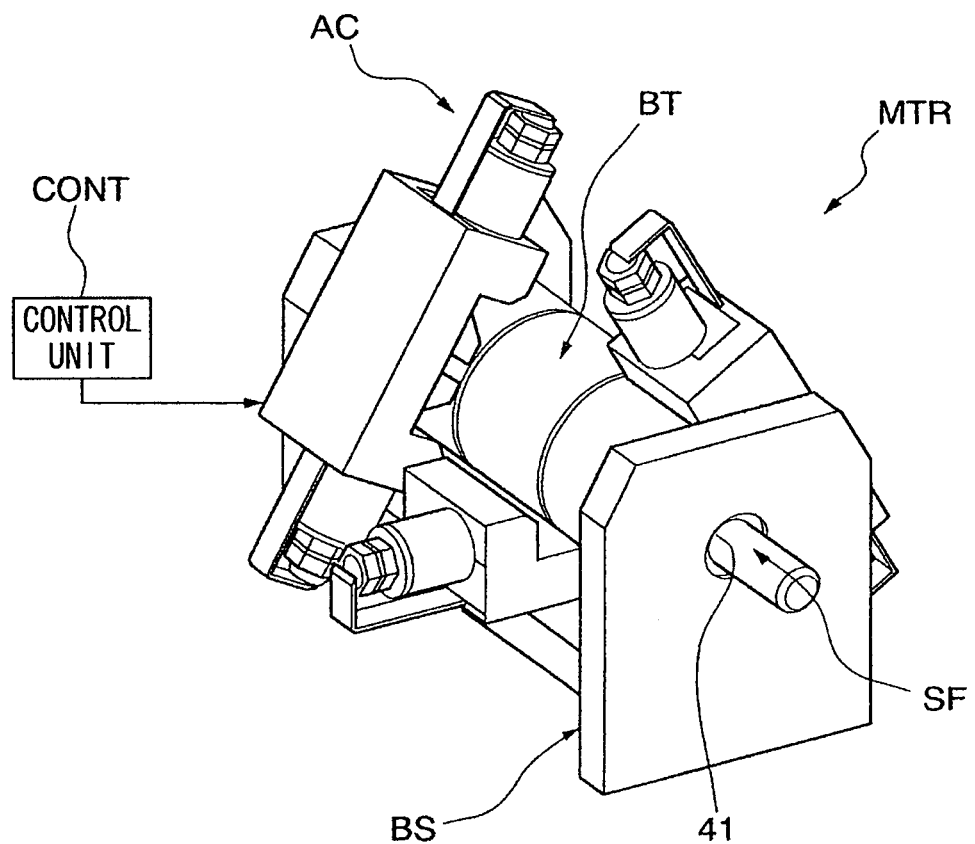
FIG. 1 is a perspective view showing a configuration of a motor device according to a first embodiment of the invention.

A first embodiment of the invention will be described. FIG. 1 is a schematic configuration view showing an example of a motor device MTR according to this embodiment.

As shown in this drawing, the motor device MTR has a rotor SF, a transmission member BT, a moving part AC, a supporting member BS, and a control unit CONT. The motor device MTR is configured such that the rotor SF and the moving part AC are supported by the supporting member BS, and the transmission member BT connected to the moving part AC is wound around the rotor SF. The control unit CONT is electrical connected to the moving part AC so that a control signal thereof is supplied to the moving part AC.

Figure 2:
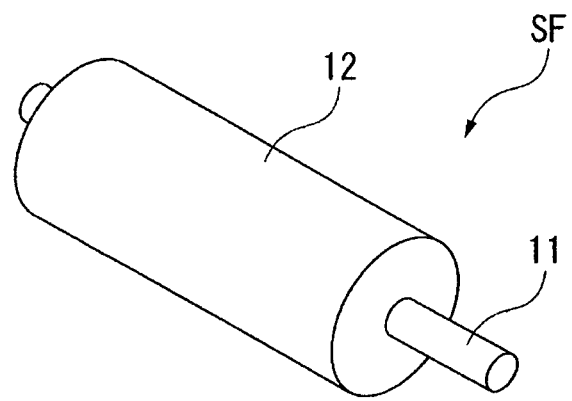
FIG. 2 is a view showing the configuration of a portion of the motor device.

FIG. 2 is a view showing the configuration of the rotor SF.

As shown in this drawing, the rotor SF is formed in a cylindrical shape, and has a shaft portion 11 and a diameter-enlarged portion 12. The shaft portion 11 is rotatably supported by a bearing 41 (refer to FIG. 1) of the supporting member BS via, for example, a bearing mechanism (not shown), etc. The diameter-enlarged portion 12 is a portion which is formed so that its diameter is larger than that of the shaft portion 11. In other words, the diameter-enlarged portion 12 has a larger diameter than the shaft portion 11. The shaft portion 11 and the diameter-enlarged portion 12 are formed so as to have a common rotational axis. The surface of the diameter-enlarged portion 12 becomes an outer periphery (an outer surface, an outer circumferential surface) which the transmission member BT is wrapped. In the present embodiment, the rotor SF is made of, for example, a conductive material, such as aluminum. Alternatively or also, the rotor SF can be made by use of a material other than aluminum. In the present embodiment, the rotor SF has a detector (not shown) which can detect the peripheral speed of the diameter-enlarged portion 12. The diameter of the diameter-enlarged portion 12 can be set to, for example, about 10 mm. For example, the diameter of the diameter-enlarged portion 12 can be approximately 0.5, 1, 2, 3, 4, 5, 6, 7, 8, 9, 10, 15, 20, 25, or 30 mm.

Figure 3:
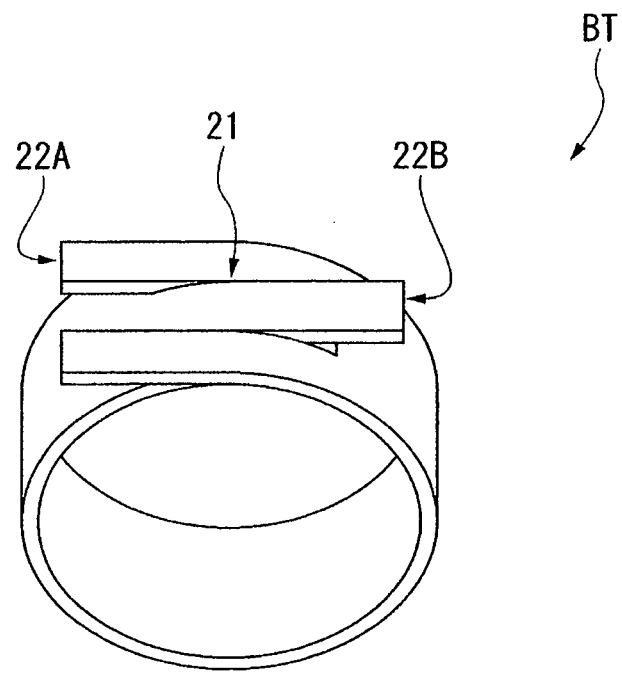
FIG. 3 is a view showing the configuration of a portion of the motor device.

FIG. 3 is a drawing showing the configuration of the transmission member BT.

As shown in this drawing, the transmission member BT is formed in the shape of a belt, and is wound around the diameter-enlarged portion 12 of the rotor SF. Illustration of the rotor SF is omitted in FIG. 3. In the present embodiment, the transmission member BT is made of, for example, a conductive material, such as steel. Alternatively or also, the transmission member BT can be made by use of a material other than steel. In the present embodiment, the transmission member BT is adapted to be wound around and cross the diameter-enlarged portion 12, for example, by one rotation. In other words, the substantial number of turns of the transmission member BT on the diameter-enlarged portion 12 is about 1.0. In another embodiment, the substantial number of turns of the transmission member BT on the diameter-enlarged portion 12 can be, for example, about 0.2, 0.4, 0.6, 0.8, 1.2, 1.4, 1.6, 1.8, 2.0, or more. In the present embodiment, a crossing portion 21 of the transmission member BT has a cross-belt structure. Specifically, in the crossing portion 21, a first end 22A of the transmission member BT is bifurcated, and a second end 22B of the transmission member BT becomes narrow. For this reason, the transmission member BT crosses in a state where the second end 22B is arranged between the two prongs of the first end 22A. The first end 22A and the second end 22B of the transmission member BT are connected to the moving part AC, respectively.

A plurality of (for example three) such transmission members BT, as shown in FIG. 1, is provided along an axial direction of the rotor SF. The respective widths (dimensions in the direction of the rotational axis) of the three transmission members BT are made equal to each other. The respective crossing portions 21 of the three transmission members BT are arranged at positions which deviate (shift) at equal angles, specifically, at positions which deviate (shift) by every 120°, in a circumferential direction of the rotor SF. The coefficients of friction between the three transmission members BT and the diameter-enlarged portion 12 of the rotor SF are set to be, for example, 0.3, respectively. In another embodiment, the number of the transmission members BT with respect to one the rotor SF can be, for example, 1, 2, 4, 5, 6, 7, 8, 9, 10 or more. In the present embodiment or the other embodiments, the coefficients of friction between the transmission member BT and the diameter-enlarged portion 12 of the rotor SF can be set to be, for example, approximately 0.1, 0.2, 0.3, 0.4, 0.5, 0.6, 0.7, 0.8, 0.9, or more.

Figure 4:
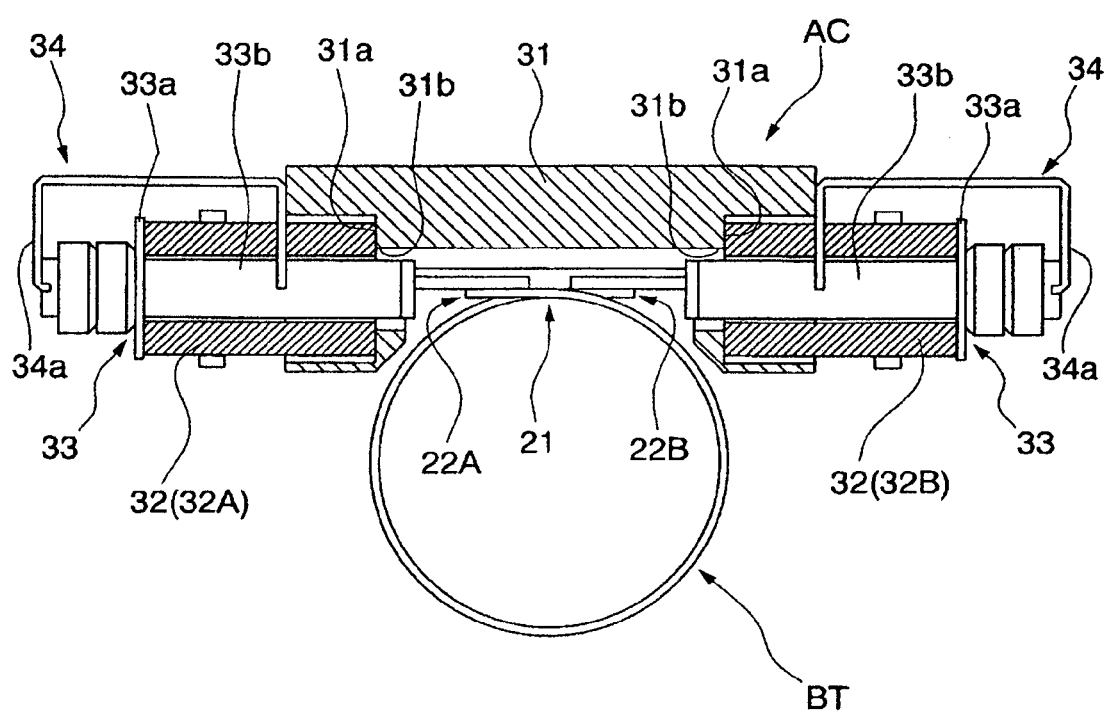
FIG. 4 is a view showing the configuration of a portion of the motor device.

FIG. 4 is a drawing showing the configuration of the moving part AC. In FIG. 4, a configuration in which the moving part AC is connected to the transmission member BT is shown.

At least a part of the moving part AC is provided in the crossing portion 21 or in the adjacent part of the crossing portion 21 of each transmission member BT. The moving part AC has a holding member 31, electrostrictive elements 32, connecting portions 33, and spring mechanisms 34.

The holding member 31 is formed substantially along a tangential direction of the circumference of the rotor SF in the above crossing portion 21. The tangential direction of the holding member 31 is longitudinal. In other words, the holding member 31 has a longitudinal axis along the tangential direction. The holding member 31 has recesses 31a, respectively, at both longitudinal ends thereof. The bottom of each recess 31a is provided with an opening 31b. As shown in FIG. 1, each holding member 31 is fixed to each supporting member BS.

The electrostrictive element 32 is provided in each recess 31a of the holding member 31. For this reason, a pair of the electrostrictive elements 32 is provided so as to sandwich the crossing portion 21 as a reference position. The pair of electrostrictive elements 32 (a first electrostrictive element 32A and a second electrostrictive element 32B) are hollow cylinders (cylindrical shapes, cylindrical tube shapes), respectively. The pair of electrostrictive elements 32 (a first electrostrictive element 32A and a second electrostrictive element 32B) are provided so as to be capable of deforming in directions opposite to each other with respect to the crossing portion 21 that is a reference position (or to be capable of extending outward with respect to the crossing portion 21). As the first electrostrictive element 32A and the second electrostrictive element 32B, for example, piezoelectric elements, etc. are used. Alternatively or also, as the first electrostrictive element 32A or the second electrostrictive element 32B, an element other than piezoelectric element can be used.

The connecting portions 33 are portions which connect the first end 22A and the first electrostrictive element 32A of the transmission member BT, and connect the second end 22B and the second electrostrictive element 32B. Each connecting portion 33 has a flange member 33a and a rod member 33b. The flange members 33a are provided so as to abut on an end face of the first electrostrictive element 32A and an end face of the second electrostrictive element 32B, respectively. The rod member 33b is integrally provided with the flange member 33a. The rod members 33b are provided so as to pass through the first electrostrictive element 32A and the second electrostrictive element 32B, respectively, and so as to pass through the openings 31b of the recesses 31a, respectively. The tips of the rod members 33b are respectively connected to the first end 22A and the second end 22B of the transmission member BT. By adopting such a configuration, the direction of a force caused by the electrostrictive element 32 and the tangential direction in the crossing portion 21 of the outer periphery of the rotor SF substantially coincide with each other. Thus, the transmission efficiency of a force from the electrostrictive element 32 to the transmission member BT is high.

The spring mechanism 34 is adapted to press the flange member 33a towards the crossing portion 21. The spring mechanism 34 is constituted of, for example, a leaf-spring member 34a. The leaf-spring member 34a has, for example, one end connected to the outer surface of the flange member 33a via a nut, etc., and folded back so as to bypass the flange member 33a, and has the other end fixed to the end face of the holding member 31. For example, the other end side of the leaf-spring member 34a is bent so as to abut on the end face of the holding member 31.

Figure 5:
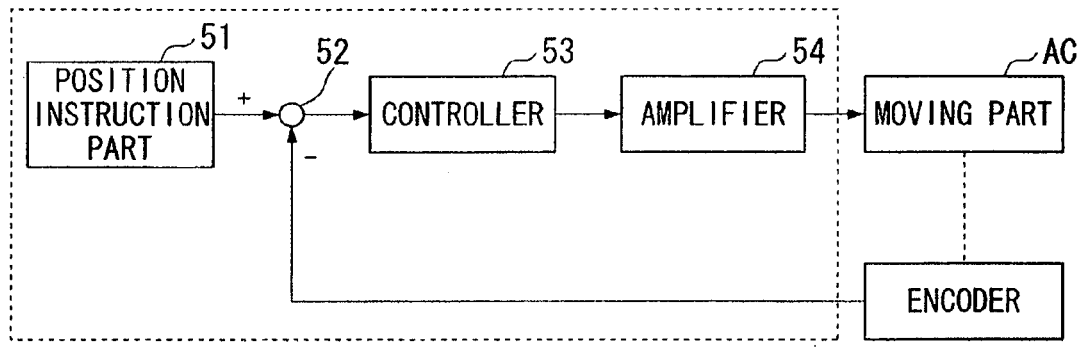
FIG. 5 is a view showing the configuration of a control unit of the motor device.

FIG. 5 is a block diagram showing the configuration of the control unit CONT. The control unit CONT has a position instruction part 51, an operation part 52, a controller 53, and an amplifier 54. The motor device MTR is adapted so that the output value of the moving part AC can be detected by an encoder. The control unit CONT converts deformation volume, and a speed error of deformation in the first electrostrictive element 32A and the second electrostrictive element 32B into thrust, on the basis of the detection value of the encoder, and takes the thrust as an instruction value for the moving part AC.

Next, the operation of the motor device MTR configured as described above will be described.

Figure 6:
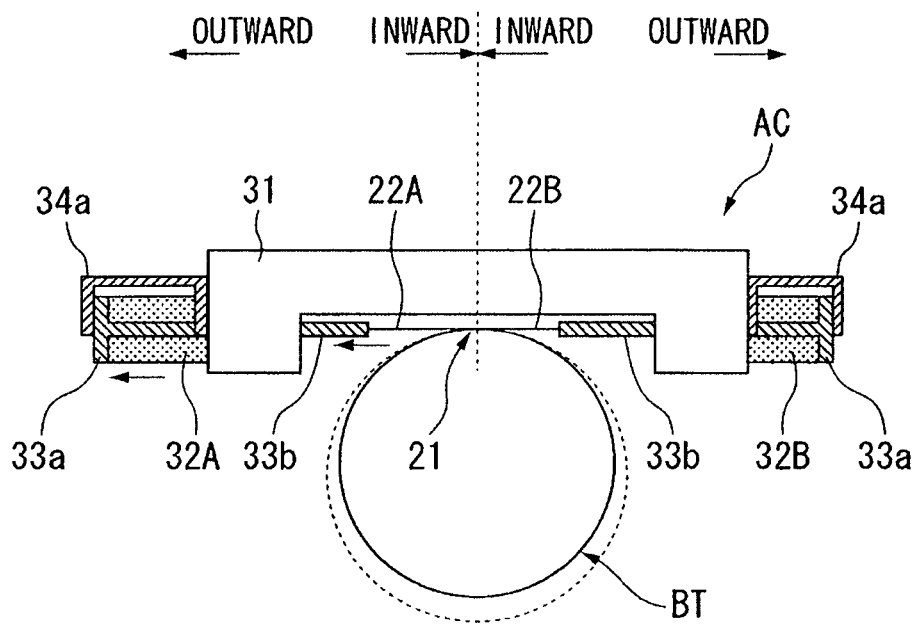
FIG. 6 is a view showing the operation of the motor device.
Figure 7:
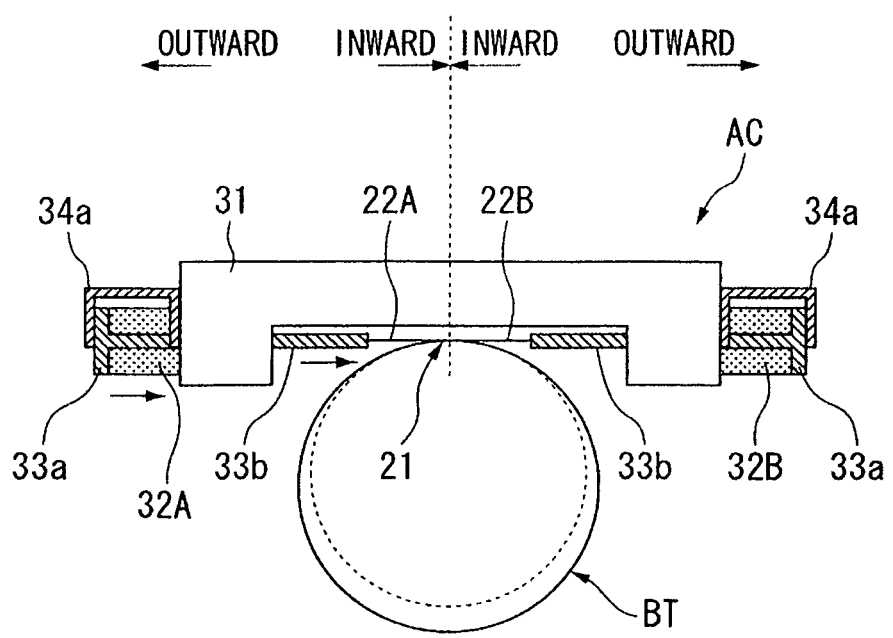
FIG. 7 is a view showing the operation of the motor device.

First, the operation of the moving part AC will be briefly described with reference to FIGS. 6 and 7. In order to discriminate easily between aspects of movement of the transmission member BT, FIGS. 6 and 7 show the configuration of the transmission member BT in the state of being not wound around the rotor SF. Since the same operation is performed by the first electrostrictive element 32A and the second electrostrictive element 32B (here, the movement direction of the transmission member BT becomes an opposite direction) in the description of the operation of the moving part AC, the first electrostrictive element 32A will be representatively described here.

In a state where an electric signal is not supplied to the first electrostrictive element 32A, the flange member 33a is pressed towards the crossing portion 21 by the spring mechanism 34. When an electric signal is supplied to the first electrostrictive element 32A from this state, as shown in FIG. 6, the first electrostrictive element 32A deforms so as to expand. The first electrostrictive element 32A has the contact end portion with the holding member 31 as a fixed end and lengthens outward with respect to the crossing portion 21. The force caused by the deformation act in a direction (hereinafter referred to as "outward") away from the crossing portion 21. This force presses the flange member 33a outward. When the pressing force caused by the deformation of the first electrostrictive element 32A becomes larger than the pressing force caused by the spring mechanism 34, the flange member 33a moves outward, and the rod member 33b pulls the end of the transmission member BT outward. By this operation, the end of the transmission member BT moves outward.

On the other hand, when the supply of an electric signal to the first electrostrictive element 32A is stopped from this state, as shown in FIG. 7, the first electrostrictive element 32A deforms so as to contract, and the pressing force to the flange member 33a decreases due to the deformation. In addition, since the pressing force caused by the spring mechanism 34 acts, the flange member 33a moves in a direction (hereinafter referred to as "inward") approaching the reference position, and the rod member 33b pushes the end of the transmission member BT inward. By this operation, the end of the transmission member BT moves inward.

Next, the driving operation of the rotor SF will be described with reference to FIGS. 8 to 13.

The principle of driving the rotor SF in the motor device MTR according to this embodiment will be described. When the rotor SF is driven, an effective tension is generated in the transmission member BT wound around the rotor SF, and torque is transmitted to the rotor SF by the effective tension.

According to the friction belt theory of Euler, when a tension $T_1$ on the side of the first end 22A of the transmission member BT wound around the rotor SF and a tension $T_2$ on the side of the second end 22B satisfy the following Equation 1, a frictional force is generated between the transmission member BT and the rotor SF, and the transmission member BT moves along with the rotor SF in a state (torque transmission state) where slip is not caused in the rotor SF. By this movement, torque is transmitted to the rotor SF. However, in Equation 1, μ is an apparent coefficient of friction between the transmission member BT and the rotor SF, and θ is an effective winding angle of the transmission member BT.

[Equation 1]

$$T_1 = T_2 e^{\mu\theta} \quad (1)$$

At this time, the effective tension which contributes to transmission of the torque is expressed by $(T_1-T_2)$. When the effective tension $(T_1-T_2)$ is obtained on the basis of the above Equation 1, the following Equation 2 is obtained. Equation 2 is an equation which expresses the effective tension using $T_1$.

[Equation 2]

$$T_1 - T_2 = \frac{e^{\mu\theta} - 1}{e^{\mu\theta}} \cdot T_1 \quad (2)$$

Figure 8:
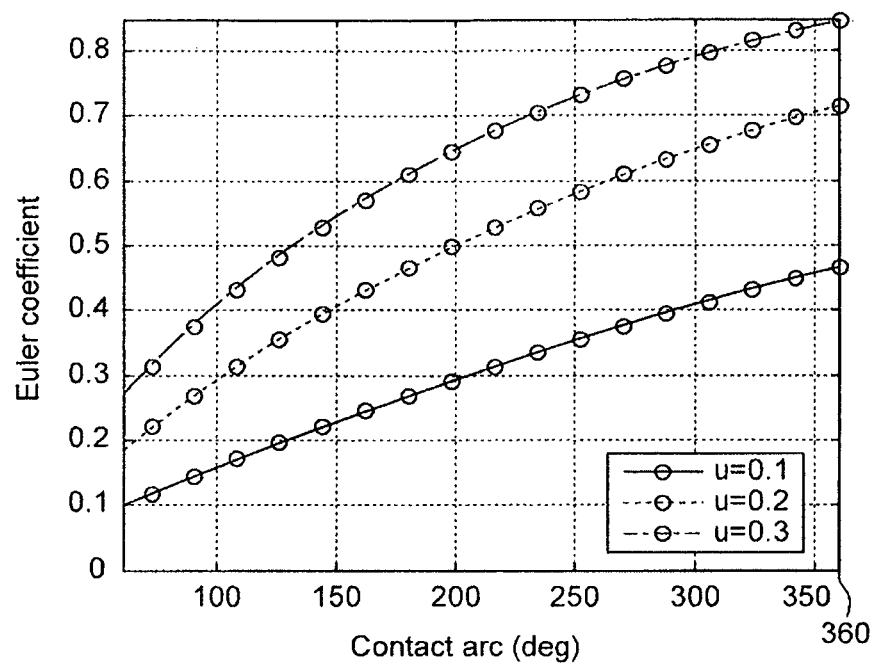
FIG. 8 is a graph showing characteristics of the motor device.

It can be understood from the above Equation 2 that the torque transmitted to the rotor SF is uniquely determined by the tension $T_1$ of the first electrostrictive element 32A. A coefficient portion of $T_1$ of the right side of Equation 2 depends on the coefficient of friction μ between the transmission member BT and the rotor SF, and the effective winding angle θ of the transmission member BT, respectively. FIG. 8 is a graph showing the relationship between the effective winding angle θ and the value of a coefficient portion when the coefficient of friction μ is changed. The abscissa axis of the graph represents the effective winding angle θ, and the ordinate axis of the graph represents the value of a coefficient portion.

As shown in FIG. 8 for example, if the coefficient of friction μ is 0.3, the value of the coefficient portion becomes equal to or more than 0.8 when the effective winding angle θ is equal to or more than 300°. It can be understood from this that, if the coefficient of friction μ is 0.3, 80% or more of the tension $T_1$ caused by the first electrostrictive element 32A contributes to the torque of the rotor SF by setting the effective winding angle θ to 300° or more. Besides this winding angle, it is estimated from the graph of FIG. 8 that the value of the coefficient portion becomes larger as, for example, the coefficient of friction between the transmission member BT and the rotor SF is made larger.

As such, it can be understood that the magnitude of the torque is uniquely determined by the tension $T_1$ of the first electrostrictive element 32A, and is not related to the moving distance of the transmission member BT. Accordingly, for example, even if the piezoelectric elements used for the first electrostrictive element 32A and the second electrostrictive element 32B are small elements of about several millimeters, a force of hundreds or more of Newtons (Ns) can be output. Thus, a very large torque can be given.

Figure 9:
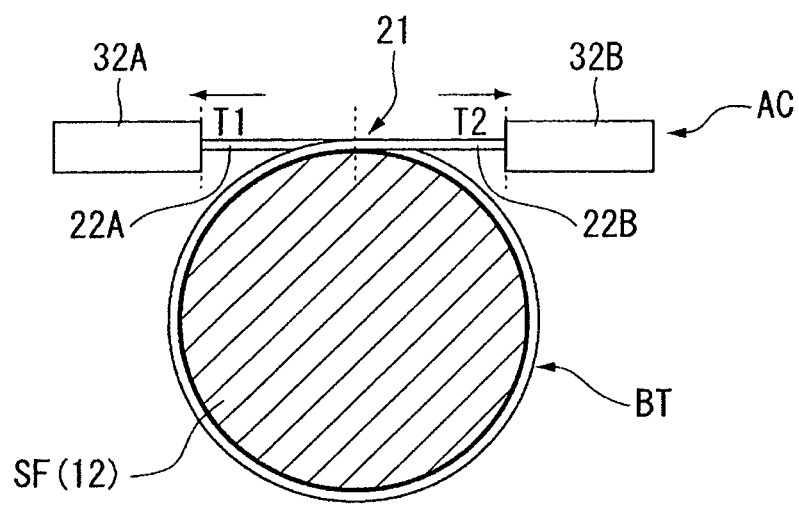
FIG. 9 is a view showing the operation of the motor device.

On the basis of such a principle, as shown in FIG. 9, the control unit CONT can control the first electrostrictive element 32A and the second electrostrictive element 32B to rotate (or to rotary drive) the rotor SF. The control unit CONT can comprises at least a driving mode and a returning mode. The control unit CONT first makes the first electrostrictive element 32A and the second electrostrictive element 32B deform so that the first end 22A and the second end 22B move outward, respectively (tension generating operation, tension generating mode). By this operation, the tension $T_1$ is generated on the side of the first end 22A of the transmission member BT, and the tension $T_2$ is generated on the side of the second end 22B of the transmission member BT. Accordingly, the effective tension $(T_1-T_2)$ is generated in the transmission member BT.

Figure 10:
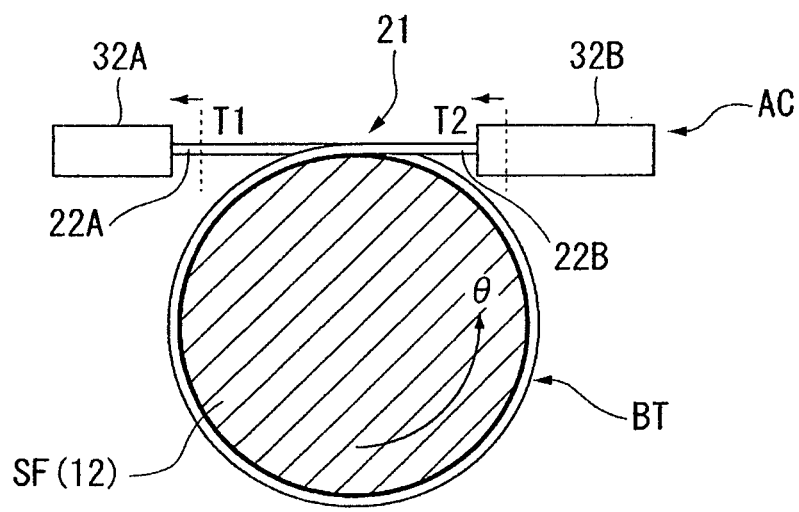
FIG. 10 is a view showing the operation of the motor device.

The control unit CONT makes the first electrostrictive element 32A and the second electrostrictive element 32B deform so that the first end 22A of the transmission member BT moves outward and the second end 22B moves inward (driving operation, driving mode), as shown in FIG. 10, while holding the state where the effective tension is generated in the transmission member BT. In this operation, the control unit CONT makes the moving distance of the first end 22A and the moving distance of the second end 22B equal to each other. By this operation, the transmission member BT moves in a state where a frictional force has been generated between the transmission member BT and the rotor SF, and along with this movement, the rotor SF rotates in the direction of θ in the drawing.

In this embodiment, the coefficient of friction μ between the transmission member BT and the rotor SF is 0.3, and the transmission member BT is wound around the diameter-enlarged portion 12 of the rotor SF by one rotation (360°). Accordingly, referring to the graph of FIG. 8, about 85% of the tension $T_1$ of the first electrostrictive element 32A is transmitted to the rotor SF as torque.

Figure 11:
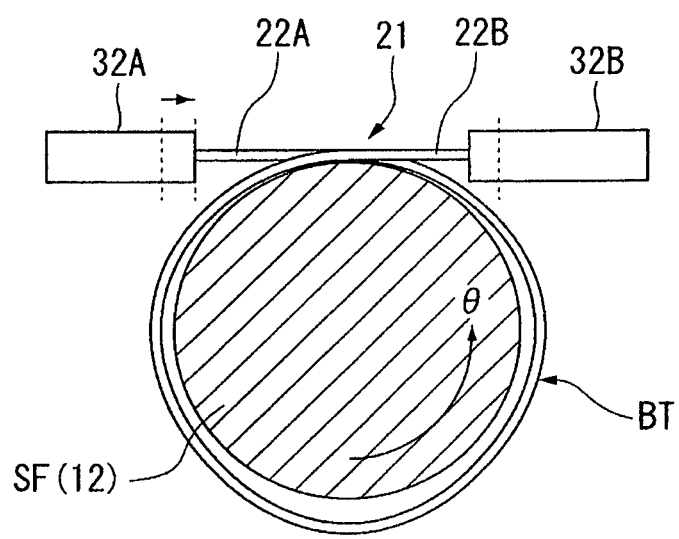
FIG. 11 is a view showing the operation of the motor device.

The control unit CONT makes only the first electrostrictive element 32A deform so that the first end 22A returns to a starting position (a given position) of driving and the second end 22B does not move, as shown in FIG. 11, after the first end 22A and the second end 22B are moved by a predetermined distance. By this operation, the first end 22A moves inward, and the winding of the transmission member BT is loosened. That is, the effective tension transmitted to the transmission member BT is released. In this state, a frictional force is not generated between the transmission member BT and the rotor SF, and the rotor SF continues rotating by inertia.

Figure 12:
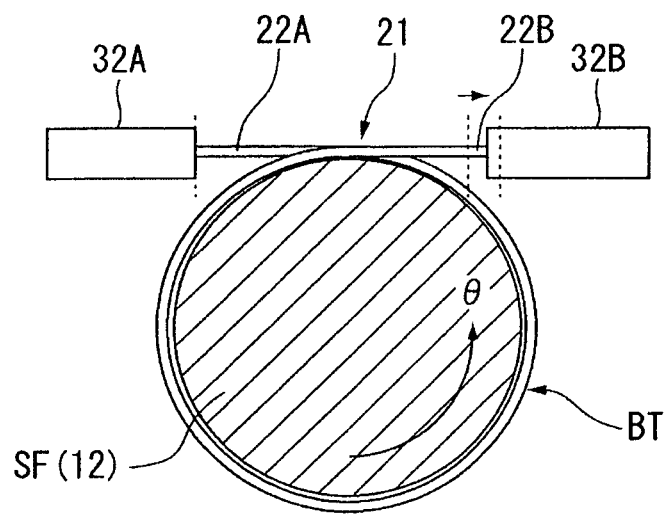
FIG. 12 is a view showing the operation of the motor device.

The control unit CONT makes the second electrostrictive element 32B deform so that the second end 22B returns to a starting position (a given position) of driving, as shown in FIG. 12, after the winding of the transmission member BT is loosened. By this operation, with the winding of the transmission member BT loosened, that is, while the effective tension is not generated, the second end 22B of the transmission member BT returns to the starting position (given position) of driving (returning operation, returning mode).

Figure 13:
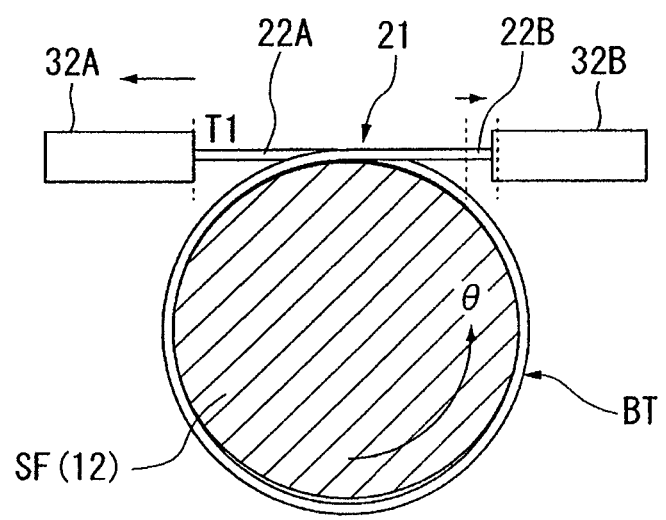
FIG. 13 is a view showing the operation of the motor device.

If the second end 22B is located at a position immediately before being returned to the driving starting position, as shown in FIG. 13, the control unit CONT makes the first electrostrictive element 32A deform and makes the first end 22A move outward (tension generating operation, tension generating mode). By this operation, almost simultaneously when the second end 22B is returned to the driving starting position, the tension $T_1$ is generated on the side of the first end 22A, and the tension $T_2$ is generated on the side of the second end 22B. This brings about the same state as the state (state of FIG. 9) where the effective tension is transmitted to the transmission member BT at the start of driving.

After the effective tension is transmitted to the transmission member BT, the control unit CONT makes the first electrostrictive element 32A deform so that the first end 22A of the transmission member BT moves outward, and makes the second electrostrictive element 32B deform so that the second end 22B moves inward (driving operation, driving mode). At this time, the moving distance of the first end 22A and the moving distance of the second end 22B are made equal to each other. By this operation, the transmission member BT moves in a state where a frictional force has been generated between the transmission member BT and the rotor SF, and along with this movement, the rotor SF rotates in the direction of θ.

Thereafter, the control unit CONT makes the effective tension transmitted to the transmission member BT released again. After the effective tension is released, the control unit CONT makes the first end 22A and the second end 22B of the transmission member BT move so as to return to the starting position (returning operation, returning mode). As the control unit CONT makes the moving part AC repeat the above driving operation and returning operation in this way, the rotor SF continues rotating in the direction of θ. In other words, tension generating mode, driving mode, and returning mode are repeated in turn.

In this embodiment, since three sets of combinations of the transmission member BT and the moving part AC are provided along the direction of the rotational axis of the rotor SF, a three-phase structure is provided. Accordingly, the three-phase transmission members BT and moving parts AC can be sequentially driven for every phase.

Figure 14:
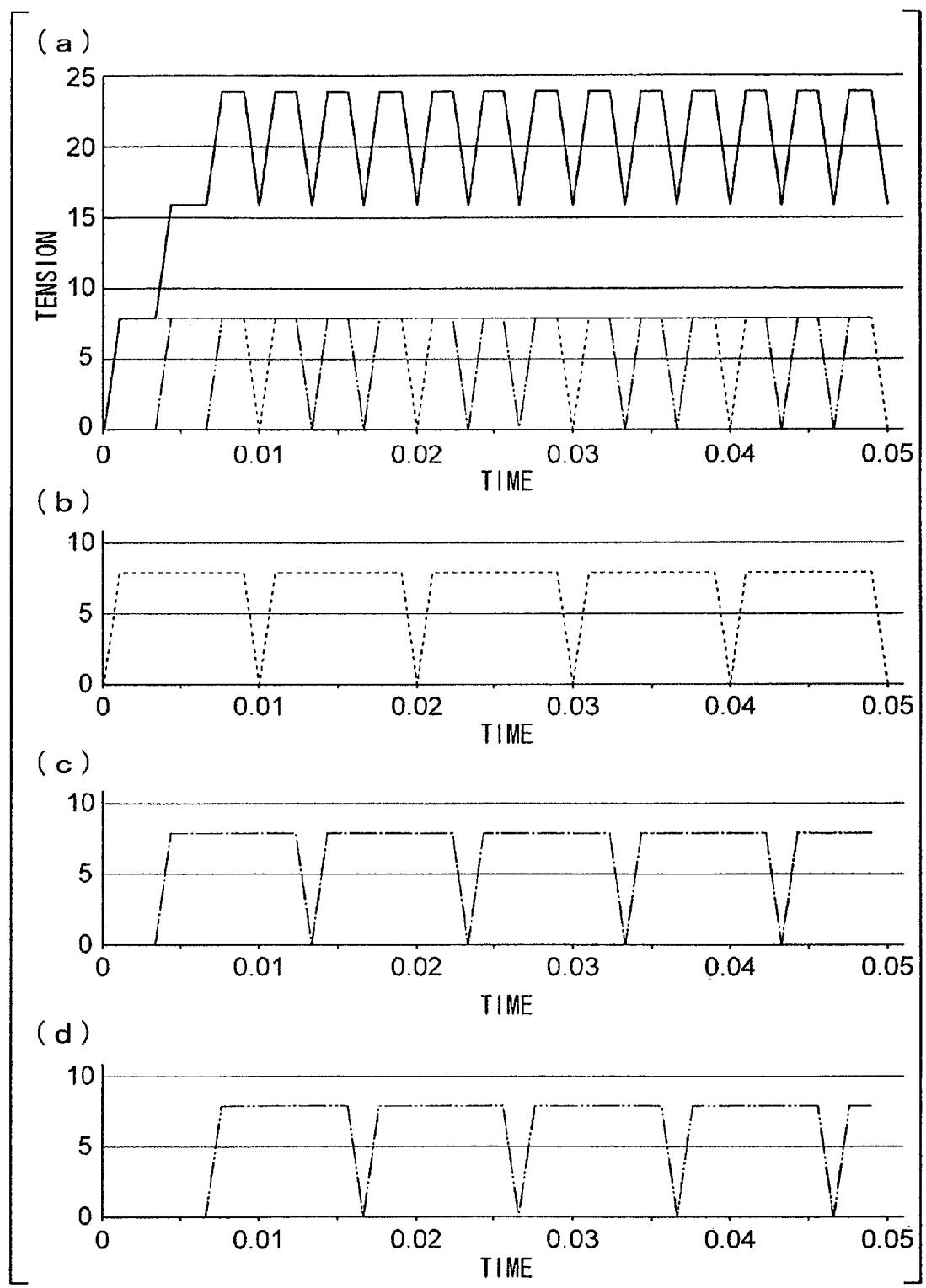
FIG. 14 is a graph showing characteristics of the motor device.

FIG. 14 is a graph showing the relationship between tension and time when the three-phase transmission members BT and moving parts AC are alternately driven. The abscissa axis of the graph represents time, and the ordinate axis of the graph represents tension. In parts (a)-(d) of FIG. 14, the broken line, one-dot chain line, and two-dot chain line of the graphs show driving of the respective phases. The solid line of the graph shows the tension in the whole rotor SF. Parts (b)-(d) of FIG. 14 show driving of the respective phases in part (a) of FIG. 14. In addition, here, one-phase driving time is set to 0.01 second. As shown in this drawing, it can be understood that, when driving is alternately performed in three phase, the amplitude of vibration of the tension is suppressed to be small, and stable driving can be performed.

As such, according to this embodiment, the moving part AC is made to perform the driving operation and the returning operation in a state where the transmission member BT is wound around at least a portion of the rotor SF. Thus, according to the friction belt theory of Euler, torque is uniquely determined by one tension to be transmitted to the transmission member BT. Accordingly, even if a speed reducer, etc. is not used, and the moving part AC is small, it is possible to transmit high torque to the rotor SF. This makes it possible to obtain a small motor device MTR capable of generating high torque. Additionally, even if the moving part AC is small, it is possible to rotate the rotor SF with high efficiency.

Additionally, according to this embodiment, the torque transmitted to the rotor SF can be controlled by controlling the magnitude of the tension $T_1$ caused by the first electrostrictive element 32A. Thus, a torque control can be easily performed.

Second Embodiment

Next, a second embodiment of the invention will be described.

This embodiment is different from the first embodiment in that the elastic deformation of the transmission member BT is utilized during the operation of the motor device MTR. Accordingly, as for the configuration of the motor device MTR, the same configuration as the first embodiment can be used except a point that the transmission member BT is made elastically deformable.

In this embodiment, the spring constant of the transmission member BT is set to k. Here, the holding force $T_C$ of the rotor SF is set like the following Equation 3 according to the friction belt theory of Euler. The holding force $T_C$ is a force required to make the stationary rotor SF begin to move. Additionally, when the target tension on the side of the first end 22A is defined as $T_{1e}$, the target tension on the side of the second end 22B is defined as $T_{2e}$, and a target effective tension is defined as $T_{goal}$, the following Equation 4 and Equation 5 are satisfied.

[Equation 3]

$$T_C=(T_{1e}+T_{2e})/2 \tag{3}$$

[Equation 4]

$$T_{1e}=T_{goal} \bullet e^{\mu\theta}/(e^{\mu\theta}-1) \tag{4}$$

[Equation 5]

$$T_{2e}=T_{goal}/(e^{\mu\theta}-1) \tag{5}$$

Hereinafter, the driving operation of the rotor SF will be mainly described with reference to FIGS. 15 to 20. In this embodiment, in order to make the explanation easy to understood, the configuration of the motor device is schematically shown. Accordingly, for example, the winding angle, etc. of the transmission member BT are described differently from an actual configuration.

In the following description, the respective positions of the first end 22A and second end 22B of the transmission member BT which is brought into a state where tension is not transmitted to the transmission member BT, and the transmission member BT is wound around the rotor SF by one rotation are set to an origin position 0, respectively. Accordingly, in a state where both the first end 22A and second end 22B of the transmission member BT are arranged at the origin position 0, a frictional force is not generated between the transmission member BT and the rotor SF.

<Driving Operation>

Figure 15:
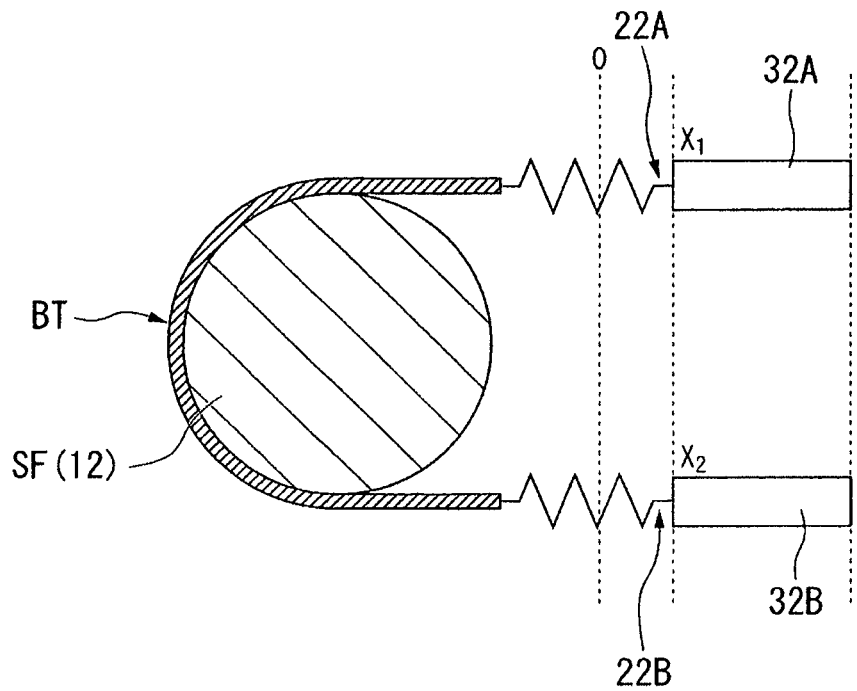
FIG. 15 is a view showing the operation of a motor device according to a second embodiment of the invention.

First, the control unit CONT, as shown in FIG. 15, makes the first electrostrictive element 32A deform so that the first end 22A of the transmission member BT moves by $X_1$ outward from the origin position 0. Additionally the control unit CONT makes the second electrostrictive element 32B deform so that the second end 22B of the transmission member BT moves by $X_2$ outward from the origin position 0. This state is defined as the initial state of the driving operation. At this time, $X_1$ and $X_2$ satisfy the following Equation 6.

[Equation 6]

$$X_1=X_2=T_c/K \tag{6}$$

K: Spring constant of belt

Figure 16:
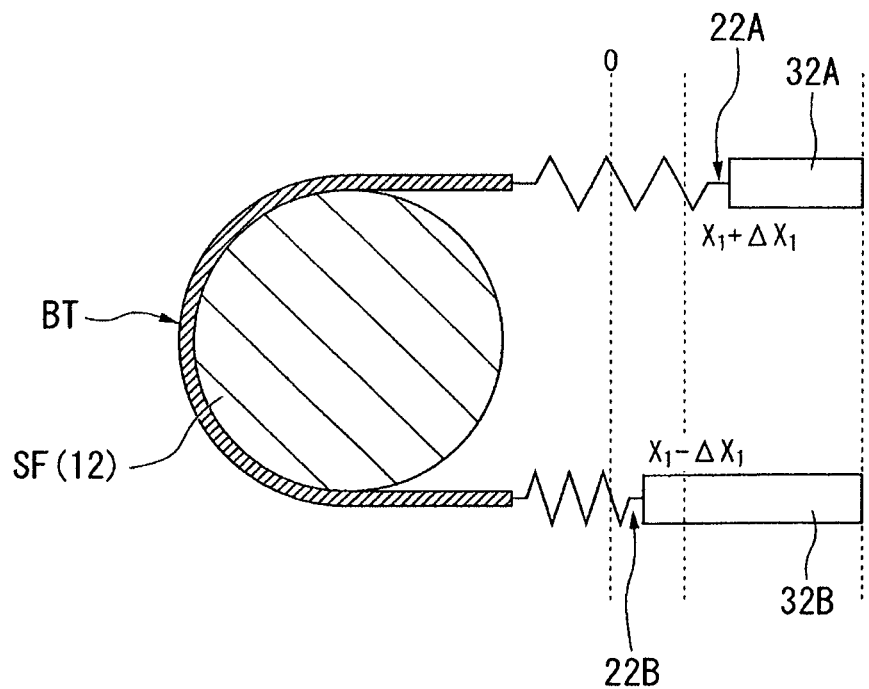
FIG. 16 is a view showing the operation of the motor device.

From this state, as shown in FIG. 16, the control unit CONT makes the first electrostrictive element 32A deform and makes the first end 22A move outward by $\Delta X_1$ (to the right in FIG. 16) so that the tension $T_1$ on the side of the first end 22A of the transmission member BT becomes the target tension $T_{1e}$. Additionally, the control unit CONT makes the second electrostrictive element 32B deform and makes the second end 22B move outward by $\Delta X_2$ (to the left in FIG. 16) so that the tension $T_2$ on the side of the second end 22B becomes the target tension $T_{2e}$. By this operation, torque is transmitted to the rotor SF from the transmission member BT. At this time, the relationship of Equation 7 is established between $\Delta X_1$ and $\Delta X_2$.

[Equation 7]

$$\begin{aligned} \Delta X_1 &= (T_{1e}-T_c)/K \\ &= (T_{1e}-T_{2e})/2K \\ &= T_{goal}/2K \end{aligned} \tag{7}$$

Figure 17:
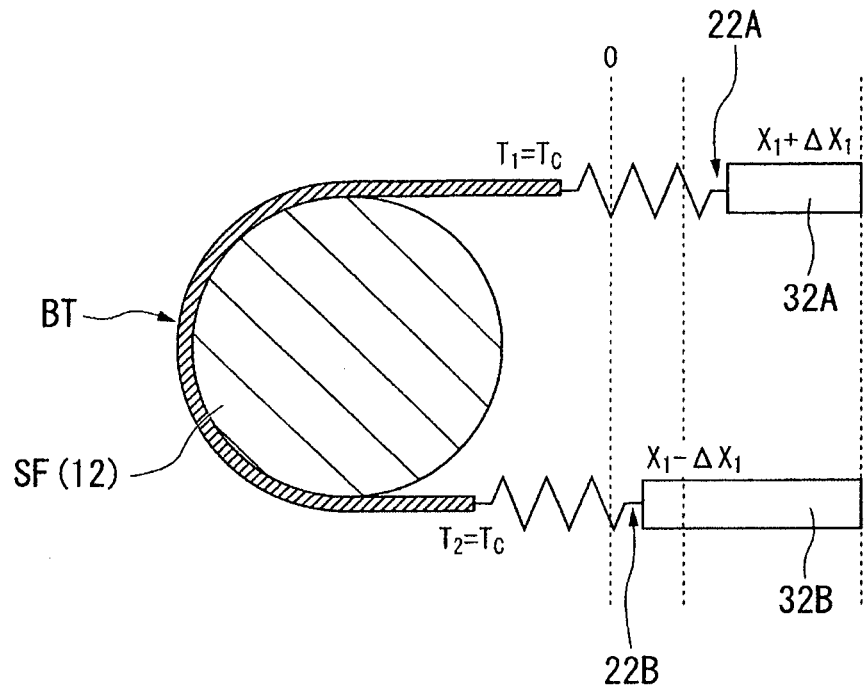
FIG. 17 is a view showing the operation of the motor device.

When torque is transmitted to the rotor SF from the transmission member BT, the rotor SF rotates, and the elastic deformation of the transmission member BT is brought into the same state as the initial state. For this reason, as shown in FIG. 17, the tension $T_1$ on the side of the first end 22A and the tension $T_2$ on the side of the second end 22B in the transmission member BT become the holding force $T_C$, and are balanced with each other. At this time, since the effective tension changes linearly in approximation to zero from $T_{goal}$, the effectual effective tension transmitted to the transmission member BT becomes $T_{goal}/2$. Additionally, the torque transmitted to the rotor SF by the transmission member BT becomes zero.

<Returning Operation>

Figure 18:
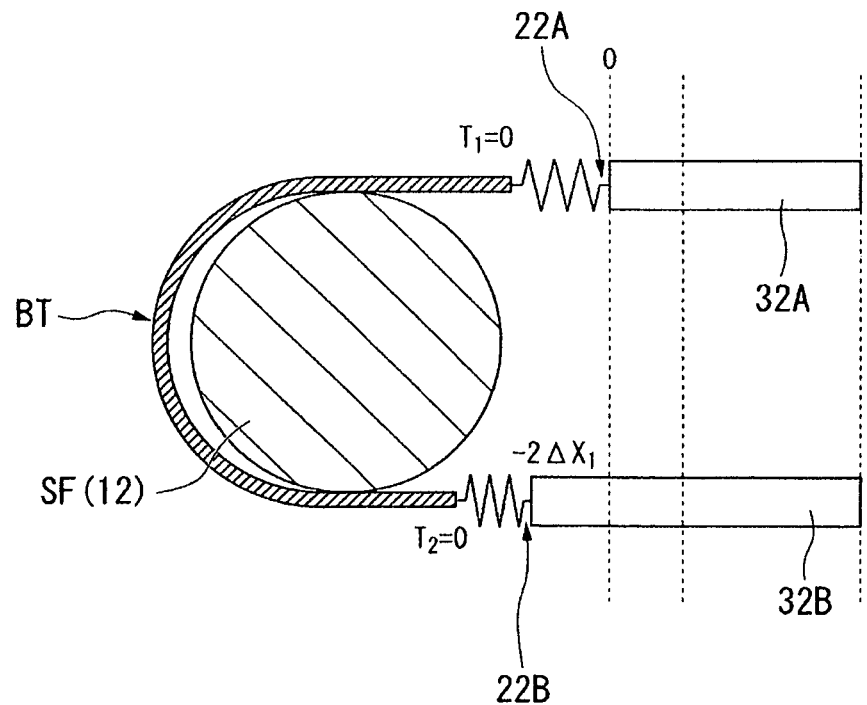
FIG. 18 is a view showing the operation of the motor device.

Next, as shown in FIG. 18, the control unit CONT makes the first end 22A move to the origin position 0, and makes the first electrostrictive element 32A and the second electrostrictive element 32B deform simultaneously so that the second end 22B moves inward (to the left in FIG. 18) further than the origin position 0. By making the first electrostrictive element 32A and the second electrostrictive element 32B deform simultaneously, the transmission member BT is loosened by $2\Delta X_1$. As a result, a gap is created between the transmission member BT and the rotor SF. The rotor SF is brought into an inertial rotational state without receiving a frictional force by the transmission member BT.

Figure 19:
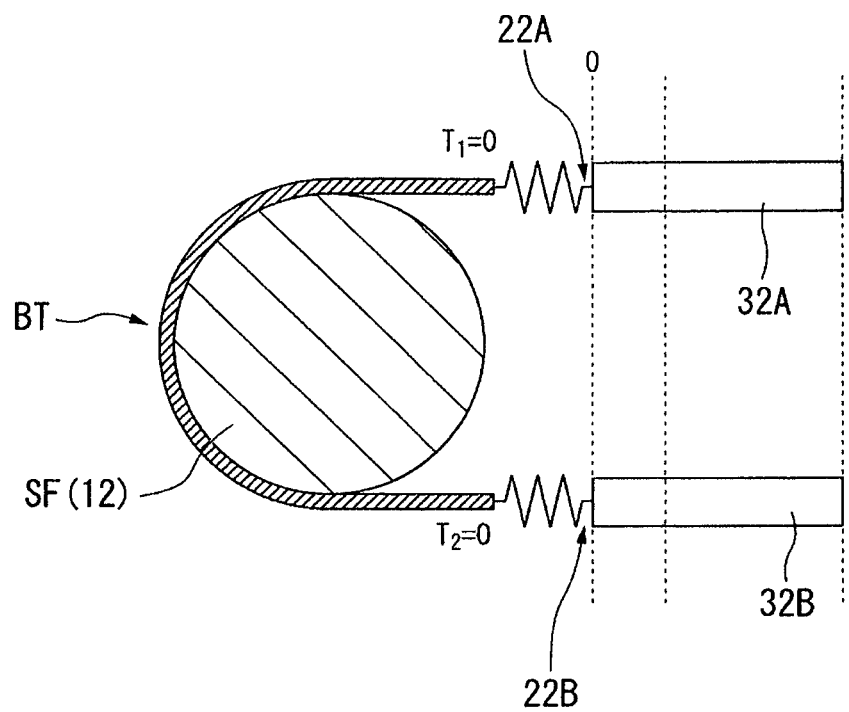
FIG. 19 is a view showing the operation of the motor device.

While the gap is created between the transmission member BT and the rotor SF, as shown in FIG. 19, the control unit CONT makes the second electrostrictive element 32B deform so that only the second end 22B returns to the origin position 0 without moving the first end 22A. By this operation, both the first end 22A and the second end 22B return to the origin position 0. Even in this state, the rotor SF is brought into an inertial rotational state without receiving a frictional force by the transmission member BT. As such, in the returning operation, the first end 22A and the second end 22B are moved to the origin position 0 in a state where the rotor SF is rotated without giving the resistance caused by a frictional force to the rotor SF.

<Driving Operation (Inertial Rotational State)>

The control unit CONT detects the peripheral speed v of the diameter-enlarged portion 12 by a detector provided in the rotor SF. The control unit CONT determines the moving distances of the first end 22A and the second end 22B on the basis of the detected result. In the above driving operation in a state where the rotor SF remains stationary, the initial position of the first end 22A is defined as $X_1$, and the initial position of the second end 22B is defined as $X_2$. In a state where the rotor SF makes inertial rotation, the same environment as the stationary state of the rotor SF is required in order to transmit the above same target effective tension to the transmission member BT. That is, it is necessary to set the relative velocity between the outer periphery of the diameter-enlarged portion 12 of the rotor SF, and the transmission member BT to zero.

For this reason, in determining the initial position of the first end 22A and the initial position of the second end 22B, it is necessary to take into consideration the moving distance of the outer periphery of the diameter-enlarged portion 12 per predetermined time. Specifically, the initial position of the first end 22A is set to $X_1+v\Delta t$ and the initial position of the second end 22B is set to $X_2-v\Delta t$. Here, $\Delta t$ includes, for example, the sampling time, etc. of the control unit CONT.

Figure 20:
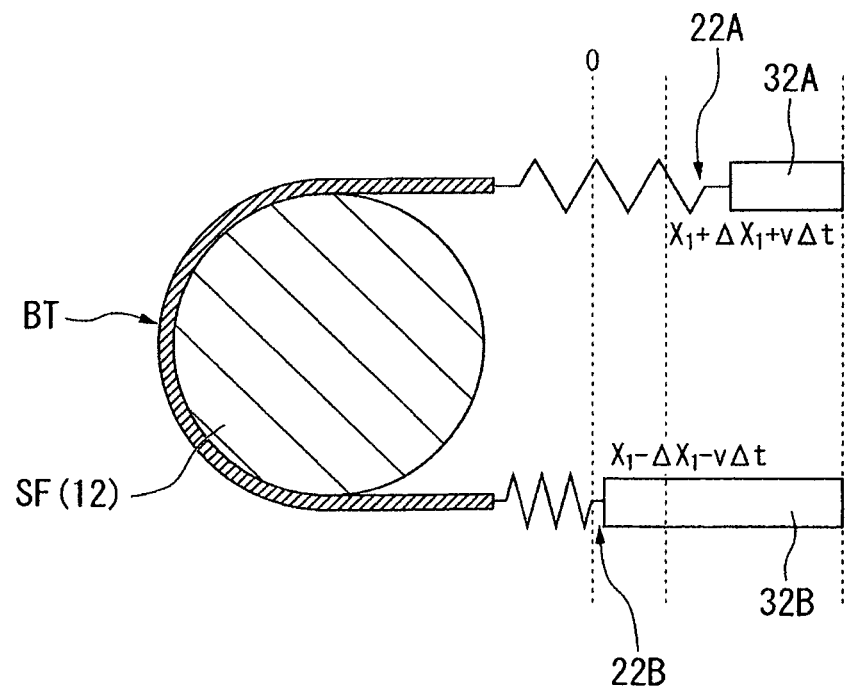
FIG. 20 is a view showing the operation of the motor device.

From this state, as shown in FIG. 20, the control unit CONT makes the first electrostrictive element 32A deform and makes the first end 22A move outward by $\Delta X_1$ (to the right in FIG. 20) so that the tension $T_1$ on the side of the first end 22A of the transmission member BT becomes the target tension $T_{1e}$. Additionally, the control unit CONT makes the second electrostrictive element 32B deform and makes the second end 22B move inward by $\Delta X_2$ (to the left in FIG. 20) so that the tension $T_2$ on the side of the second end 22B of the transmission member BT becomes the target tension $T_{2e}$. By this operation, torque is transmitted to the rotor SF from the transmission member BT. The first end 22A at this time is brought into a state where the first end has moved outward (for example, to the right in FIG. 20) with respect to the origin position 0 by $X_1+v\Delta t+\Delta X_1$. Additionally, the second end 22B at this time is brought into a state where the second end has moved outward (for example, to the right in FIG. 20) with respect to the origin position 0 by $X_2-v\Delta t-\Delta X_1$.

<Returning Operation>

Thereafter, the control unit CONT makes the first end 22A move to the origin position 0, and makes the first electrostrictive element 32A and the second electrostrictive element 32B deform simultaneously so that the second end 22B moves further inward (for example, to the left in FIG. 18) than the origin position 0. Additionally, the control unit makes the second electrostrictive element 32B deform so that only the second end 22B returns to the origin position 0 without moving the first end 22A while the gap is created between the transmission member BT and the rotor SF. By this operation, both the first end 22A and the second end 22B return to the origin position 0. The returning operation can be performed as the same operation regardless of the rotating speed of the rotor SF.

Hereinafter, the rotor SF can be performed by repeating the driving operation and the returning operation. In a case where the rotor SF is in the inertial rotational state, unless the value of the above $X_1+v\Delta t+\Delta X_1$ exceeds the amount of maximum deformation of the first electrostrictive element 32A, torque can be kept being transmitted to the rotor SF by repeating the driving operation and the returning operation.

Figure 21:
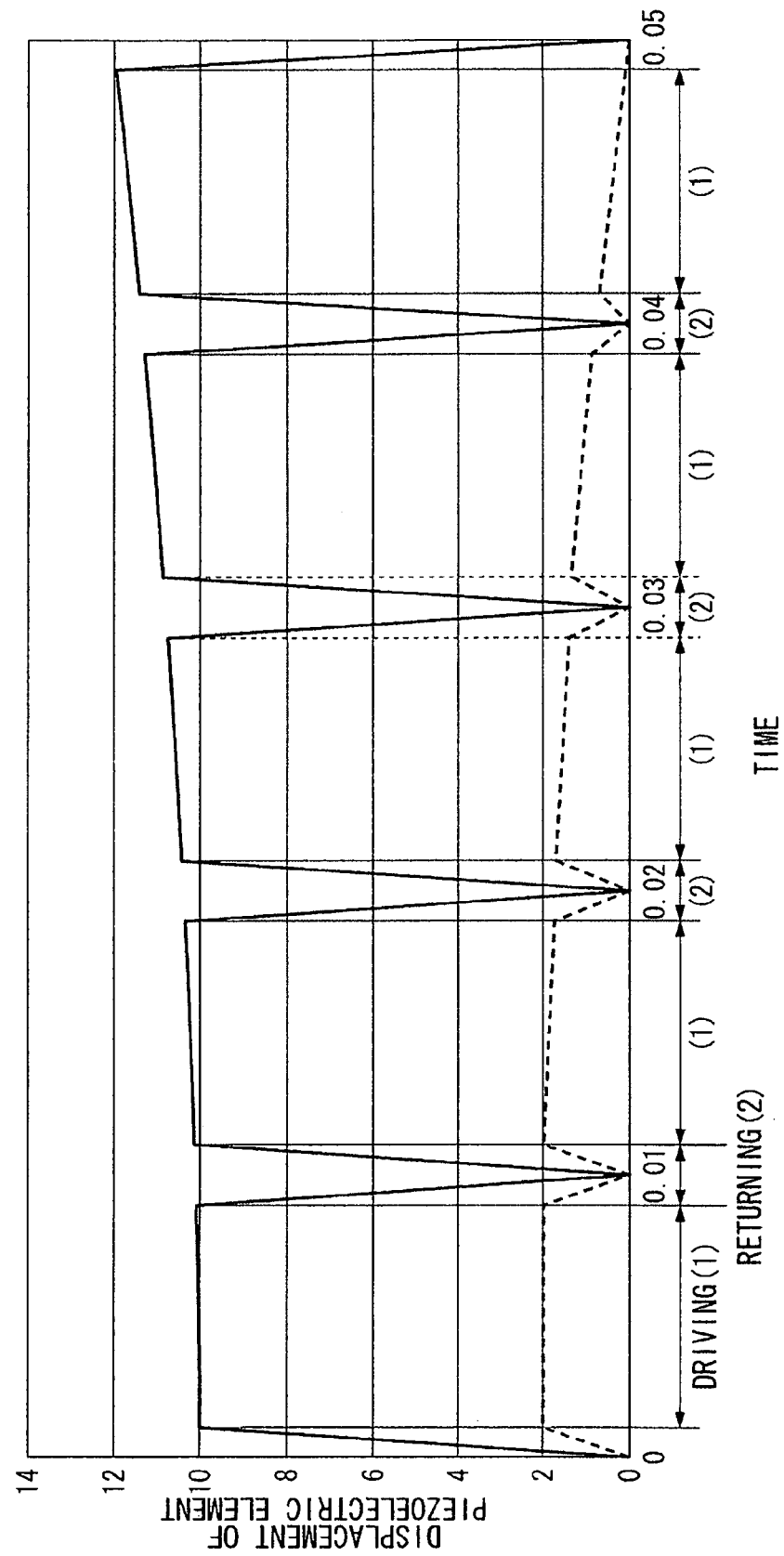
FIG. 21 is a graph showing characteristics of the motor device.

FIG. 21 is a graph showing the variation of the first electrostrictive element 32A and the second electrostrictive element 32B when the driving operation and the returning operation are repeated. The abscissa axis of the graph represents time, and the ordinate axis of the graph represents variation. A graph shown by the solid line in the drawing shows the variation of the first electrostrictive element 32A, and a graph shown by the broken line in the drawing shows the variation of the second electrostrictive element 32B. As shown in this drawing, it can be understood that the variation of the first electrostrictive element 32A becomes larger as the driving operation (1) and the returning operation (2) are repeated.

Next, the torque control in the driving operation of the rotor SF of this embodiment will be described. Effective torque $N_e$ in this embodiment depends on the time $t_{all}$ taken to perform one cycle of the driving operation and the returning operation, the time $t_e$ that is taken until the rotor SF is brought into an inertia state from the start of transmission of the effective tension, a target effective tension $T_{goal}$, and the radius R of the diameter-enlarged portion 12 of the rotor SF. Specifically, the effective torque is expressed by the following Equation 8.

[Equation 8]

$$N_e = R \bullet T_{goal} \bullet t_e / (2 \bullet t_{all}) \qquad (8)$$

As shown in Equation 8, parameters which control the effective torque $N_e$ include three, i.e., $t_{all}$, $t_e$, and $T_{goal}$. Since the time $t_{all}$ of one cycle of the driving operation and the returning operation is constantly set when performing the driving control of the rotor SF, it is preferable to control the effective torque $N_e$ by changing two values, $t_e$ and $T_{goal}$.

As such, according to this embodiment, the rotor SF can be dynamically rotated while being accelerated or decelerated by repeating the driving operation which utilizes the elastic deformation of the transmission member BT, makes zero the relative velocity between the outer periphery of the diameter-enlarged portion 12 of the rotor SF, and the transmission member BT, and transmits the effective tension of the transmission member BT to the rotor SF, and the returning operation which moves the first end 22A and the second end 22B simultaneously inward. Additionally, even if the moving part AC is small, it is possible to rotate the rotor SF with high efficiency.

Third Embodiment

Next, a third embodiment of the invention will be described.

Figure 22:
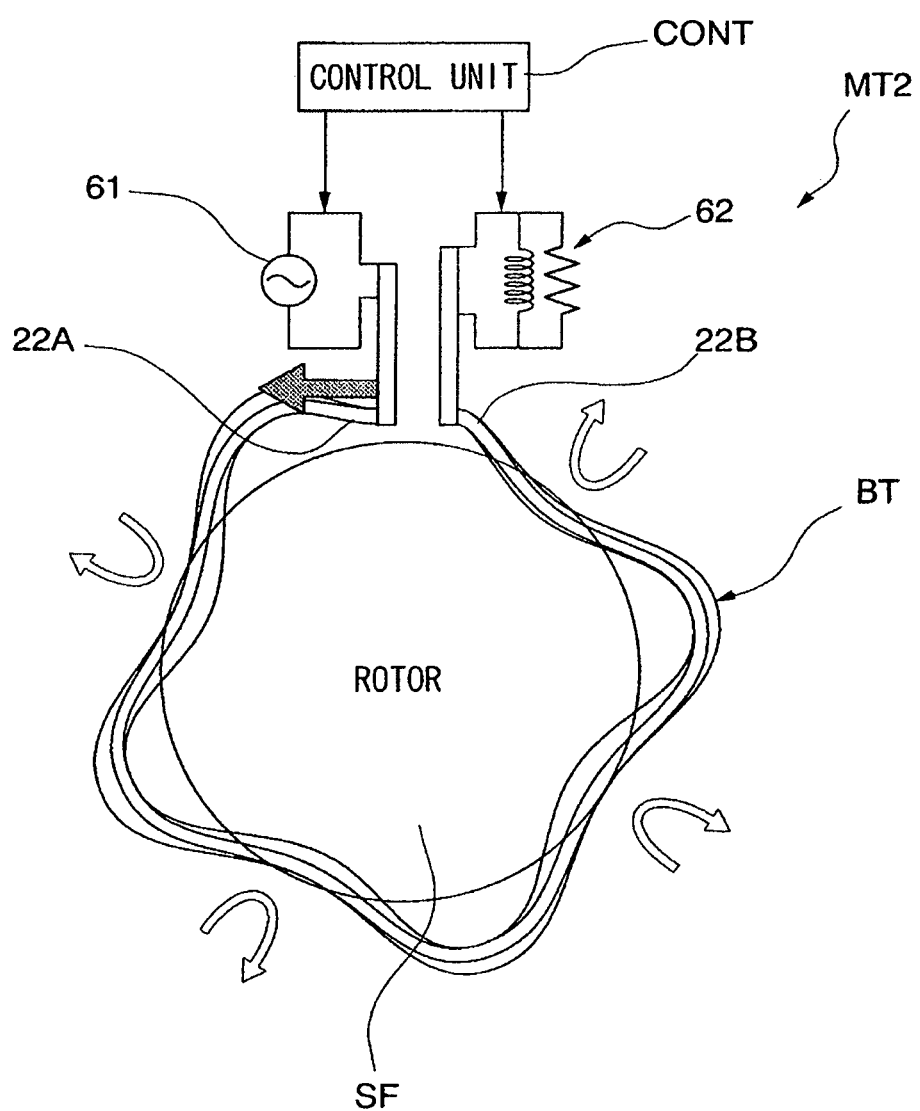
FIG. 22 is a schematic view showing a configuration of a motor device according to a third embodiment of the invention.

The motor device MT2 according to this embodiment is adapted to make a progressive wave propagate to the transmission member BT wound around the rotor SF, thereby rotating the rotor SF, as shown in FIG. 22. The transmission member BT is wound around the rotor SF in a state where no tension is transmitted. The progressive wave is easily propagated by not transmitting tension to the transmission member BT.

As for the transmission member BT, the first end 22A is connected to, for example, a vibration exciter 61, and the second end 22B is connected to, for example, a damper 62. The vibration exciter 61 and the damper 62 are connected to the control unit CONT. The control unit CONT controls the operation of the vibration exciter 61 and damper 62.

The control unit CONT makes the vibration exciter 61 driven, and thereby, makes a progressive wave (for example, 42.2 kHz) propagate to the transmission member BT. As the progressive wave propagates, the surface of the transmission member BT makes an elliptical motion. By the elliptical motion, the rotor SF rotates in a direction opposite to the propagation of the progressive wave.

Simultaneously, the control unit CONT drives the damper 62 to change the load resistance provided inside the damper 62, and takes impedance matching to reduce the reflection of the progressive wave in the second end 22B. By this operation, the stationary wave which propagates to the transmission member BT is suppressed.

The control unit CONT can reverse the propagation of the progressive wave, thereby reversing the rotational direction of the rotor SF.

As such, according to this embodiment, the rotor SF can be rotated by making a progressive wave propagate to the transmission member BT. Therefore, even if the motor device is small and if a progressive wave is made to propagate to the transmission member BT, it is possible to transmit high torque to the rotor SF. Additionally, according to this embodiment, it is possible to rotate the rotor SF with high efficiency.

Fourth Embodiment

Next, a fourth embodiment of the invention will be described.

Figure 23:
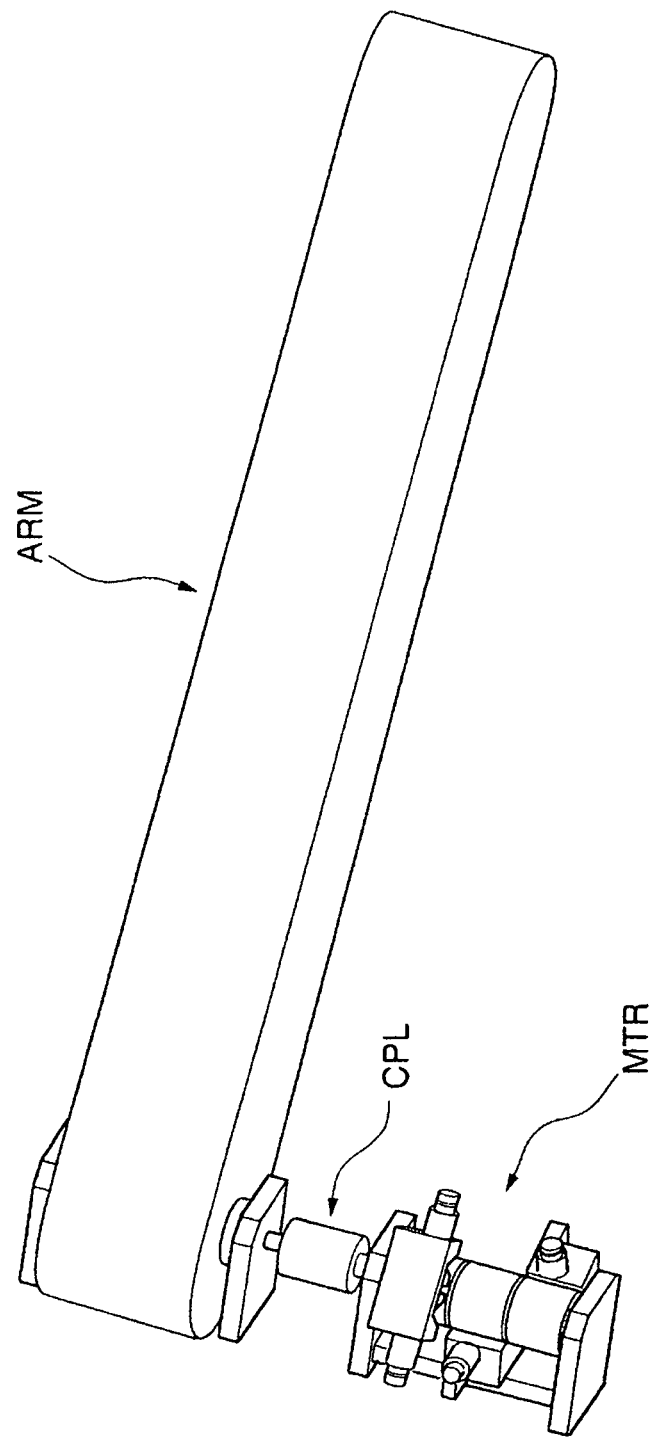
FIG. 23 is a schematic view showing an application of a motor device according to a fourth embodiment of the invention.

In this embodiment, an application of the motor device will be described. FIG. 23 is a view showing a configuration to which the motor device MTR is applied to, for example, a robot arm.

As shown in this drawing, the motor device MTR is connected to a robot arm ARM (arm portion) via a coupling CPL. Since the motor device MTR of the above embodiment is small and is able to output high torque, the robot arm ARM can be driven with high precision. Additionally, the motor device MTR of the above embodiment can be applied to a joint part of a robot (an apparatus), a driving unit of a machine tool (an apparatus), etc.

The technical scope of the invention is not limited to the above embodiments, but various modifications may be made without departing from the spirit and scope of the invention.

Figure 24A:
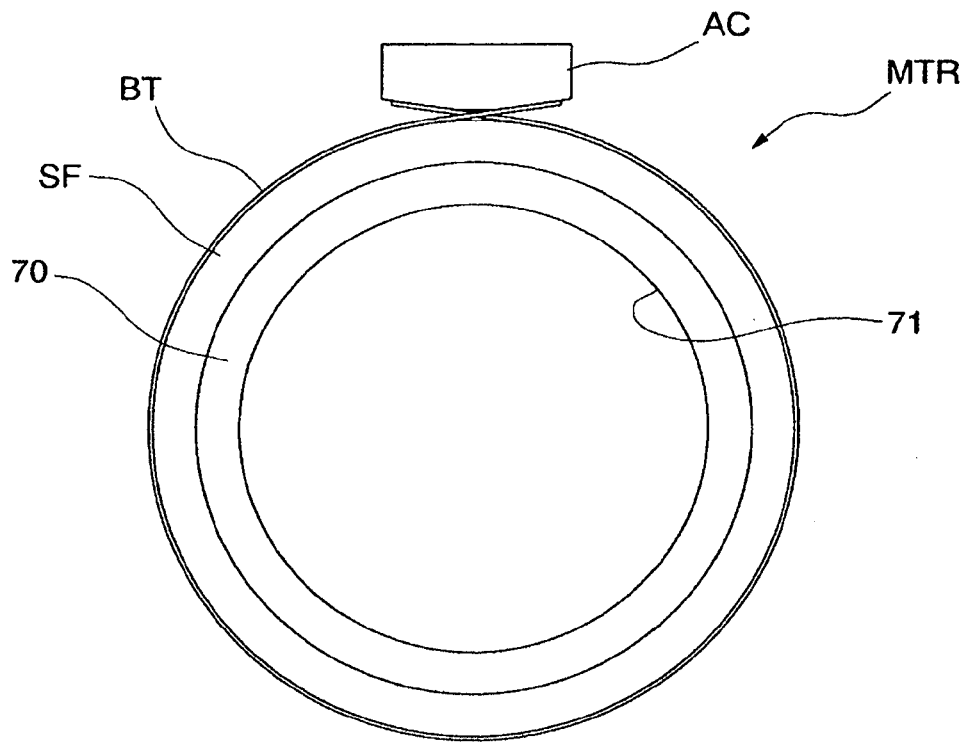
FIG. 24A is a view showing another configuration of the motor device according to the invention.

For example, although the rotor is solid circular cylinder in the above embodiment, the invention is not limited thereto. Particularly, as in the fourth embodiment, when the motor device MTR is mounted on a turning machine, such as the robot arm ARM, the rotor SF may be hollow, for example, as shown in FIG. 24A. As shown in FIG. 24A, the rotor SF has a through portion 71 passing therethrough in the direction of the rotational axis. The through portion 71 is provided with a cylindrical bearing 70. The rotor SF is made rotatable around the bearing 70.

Figure 24B:
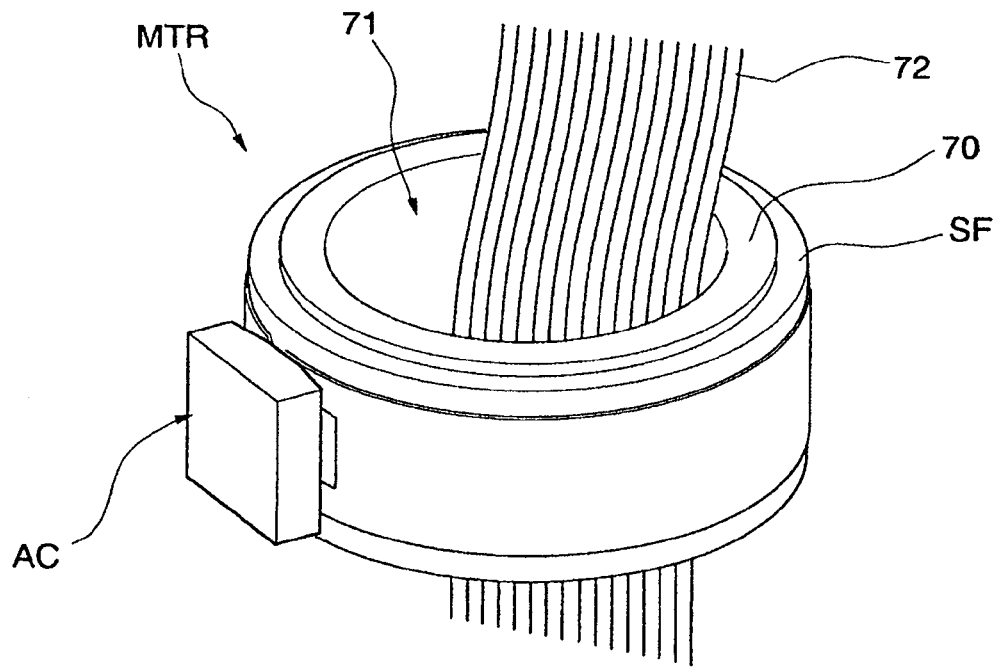
FIG. 24B is a view showing another configuration of the motor device according to the invention.

Additionally, as shown in FIG. 24B, for example, wiring 72, etc. can be arranged inside the bearing 70. As such, it is also possible to use the rotor SF as a wiring duct.

Figure 25:
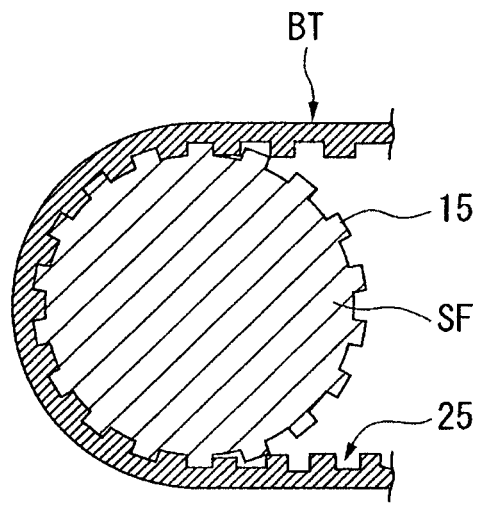
FIG. 25 is a view drawing showing still another configuration of the motor device according to the invention.

Additionally, although the above embodiment has been described in which the rotation transmission state is a state where there is no slip between the rotor SF and the transmission member BT due to a frictional force, the invention is not limited thereto. For example, as shown in FIG. 25, the rotation transmission state may be a state where the rotor SF and the transmission member BT are engaged with each other. As shown in this drawing, protrusions 15 are provided on the rotor SF, and recesses 25 are provided in the transmission member BT so as to engage with the protrusions 15. In this way, a configuration in which torque is transmitted by engaging the protrusions 15 of the rotor SF with the recesses 25 of the transmission member BT may be adopted. In addition, for example, a direction in which the protrusions 15 of the rotor SF are provided is not particularly limited, and may be a random direction, the direction of the rotational axis of the rotor SF, the circumferential direction of the rotor SF, etc. Additionally, in this embodiment, a configuration in which recesses are provided in the rotor SF, and protrusions are provided on the transmission member BT may be adopted. In addition, the size of the above protrusions (for example, protrusions 15) or recesses (for example, recesses 25) are not particularly limited. However, it is desirable that the protrusions or recesses are small such that the transmission member BT can be loosened by the moving part AC, or the protrusions or recesses are small such that a gap can be created between the rotor SF and the transmission member BT by the moving part AC. Here, the engagement in this embodiment includes, for example, the meshing between the protrusions 15 of the rotor SF and the recesses 25 of the transmission member BT, the fitting between the protrusions 15 of the rotor SF and the recesses 25 of the transmission member BT, the jointing between the protrusions 15 of the rotor SF and the recesses 25 of the transmission member BT, and the protrusions 15 of the rotor SF and the recesses 25 of the transmission member BT do not need to be completely engaged with each other.

Figure 26:
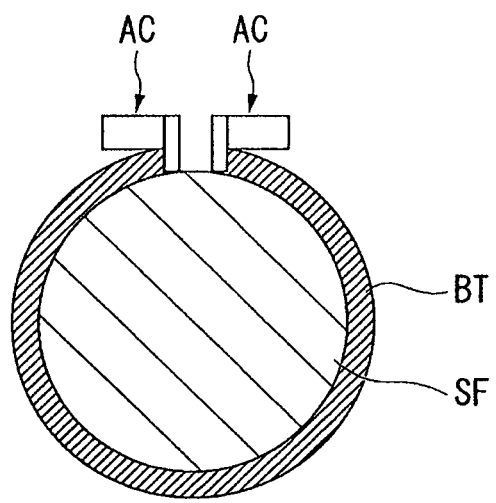
FIG. 26 is a view drawing showing a still further configuration of the motor device according to the invention.

Additionally, a closed belt structure in which the transmission member BT is wound around the rotor SF by 360° and the crossing portion 21 is provided is adopted in the above embodiment. However, the invention is not limited thereto. For example, as shown in FIG. 26, an open belt structure where the transmission member BT is wound around the rotor SF at an angle of less than 360° may be adopted. In this case, since the transmission member BT can be used for transmission of torque over its whole width, the torque can be efficiently transmitted.

Additionally, in the above embodiment, a configuration in which a positional deviation suppressing portion is provided in order to prevent the transmission member BT deviating in the direction of the rotational axis of the rotor SF may be adopted. Additionally, in the diameter-enlarged portion 12 of the rotor SF, every transmission member BT may be formed so as to have a different diameter. According to this configuration, since the transmission of torque can be changed for every the transmission member BT, broad driving becomes possible.

In the above embodiment, a configuration in which the surface of the rotor SF is flat has been described as an example. However, the invention is not limited thereto. For example, a configuration in which grooves as groove portions are formed in the surface of the rotor SF. Additionally, in the above embodiment, a configuration in which the surface of the transmission member BT is flat has been described as an example. However, the invention is not limited thereto. For example, a configuration in which grooves as groove portions are formed in the surface of the transmission member BT. Since air flow passages are formed between the transmission member BT and the rotor SF by either the grooves formed in the surface of the above rotor SF, or the grooves formed in the surface of the transmission member BT the transmission member BT can be prevented from being anchored to the rotor SF, and the transmission member BT can be attached to and detached from the rotor SF. Additionally, by providing grooves as described above, the dust, etc. caused by rubbing between the transmission member BT and the rotor SF which is generated during rotation can be put into the grooves, the frictional force between the transmission member BT and the rotor SF can be kept constant, and stable rotation can be obtained. In addition, for example, a direction in which the grooves of the rotor SF are provided is not particularly limited, and may be a random direction, the direction of the rotational axis of the rotor SF, the circumferential direction of the rotor SF, etc.

Although an example where the transmission member BT is formed in the shape of a belt has been described in the above embodiment, the invention is not limited thereto. For example, the transmission member may be formed in the shape of a line or a chain.

In the above embodiment, tension can be controlled by the displacement of the first electrostrictive element 32A and second electrostrictive element 32B. Thus, the control of held torque is possible during the stop of driving.

In the above embodiment, a configuration in which the moving part AC which moves the transmission member BT has an electrostrictive element has been described. However, the invention is not limited thereto. For example, a configuration in which the moving part uses other actuators, such as a magnetostrictor, an electromagnet, or a VCM (voice coil motor) may be adopted, instead of the electrostrictive element. For example, in a case where the magnetostrictor is used, thrust can be increased. In a case where the electromagnet is used, driving with high thrust and long stroke is possible. In a case where the VCM is used, driving with long stroke is possible, and torque control becomes easy.

According to an aspect of the invention, torque is transmitted to the rotor from the transmission member, and the rotor is rotated as the moving part performs the driving operation and the returning operation. For example, in a case where the transmission member is wound around at least a portion of the rotor which is wrapped in a torque transmission state, it is possible to rotate the rotor in an aspect where torque is uniquely determined by the tension to be transmitted to the transmission member according to the friction belt theory of Euler. Accordingly, even if the motor device is small and if tension can be generated in the transmission member, it is possible to transmit high torque to the rotor.

According to another aspect of the invention, the rotor can be rotated by making a progressive wave propagate to the transmission member. Therefore, even if the motor device is small and if a progressive wave is made to propagate to the transmission member, it is possible to transmit high torque to the rotor.

According to another aspect of the invention, torque is transmitted to the rotor from the transmission member, and the rotor is rotated as the moving part performs the driving step operation and the returning step. For example, in a case where the transmission member is wound around at least a portion of the rotor in a torque transmission state, it is possible to rotate the rotor in an aspect where torque is uniquely determined by the tension to be transmitted to the transmission member according to the friction belt theory of Euler. Accordingly, even if the motor device is small and if tension can be generated in the transmission member, it is possible to transmit high torque to the rotor.

What is claimed is:

1. A motor device comprising:
   a rotor;
   a transmission member having a flat surface and wound with respect to at least a portion of the rotor;
   a moving part connected to the transmission member to move the transmission member; and
   a control unit which controls the moving part based on a first mode and a second mode, the first mode in which at least a part of the transmission member is tightened so as to bring a torque transmissive state between the rotor and the transmission member, the second mode in which the transmission member is loosened so as to release the torque transmissive state, the transmission member having two contact points with respect to the rotor in the first mode, the two contact points being positioned on a straight line extending through a center axis of the rotor.

2. A motor device comprising:
   a rotor;
   a transmission member having a flat surface and wound with respect to at least a portion of the rotor, the transmission member having a closed structure or an intersecting structure;
   a moving part connected to the transmission member to move the transmission member; and
   a control unit which controls the moving part based on a first mode and a second mode, the first mode in which at least a part of the transmission member is tightened so as to bring a torque transmissive state between the rotor and the transmission member, the second mode in which the transmission member is loosened so as to release the torque transmissive state.

3. A motor device comprising:
   a rotor;
   a transmission member having a flat surface and wound with respect to at least a portion of the rotor, the transmission member having a generally circular shape;
   a moving part connected to the transmission member to move the transmission member; and
   a control unit which controls the moving part based on a first mode and a second mode, the first mode in which at least part of the transmission member is tightened so as to bring a torque transmissive state between the rotor and the transmission member, the second mode in which the transmission member is loosened so as to release the torque transmissive state.

4. A motor device comprising:
   a rotor;
   a transmission member wound with respect to at least a portion of the rotor, the transmission member having a substantially C-shape, the C-shape having two open ends arranged such that lines which extend from the two open ends will intersect;
   a moving part connected to the transmission member to move the transmission member; and
   a control unit which controls the moving part based on a first mode and a second mode, the first mode in which at least a part of the transmission member is tightened so as to bring a torque transmissive state between the rotor and the transmission member, the second mode in which the transmission member is loosened so as to release the torque transmissive state.

5. The motor device according to claim 4,
   wherein a gap between the open ends of the transmission member is smaller than a diameter of the rotor.

6. The motor device according to claim 4,
   wherein the moving part has a pair of parts disposed adjacent to the transmission member,
   and wherein the transmission member is disposed between the rotor and each of the parts.

7. A motor device comprising:
   a rotor;
   a transmission member having a flat surface and wound with respect to at least a portion of the rotor, the transmission member having a substantially alpha-shape;
   a moving part connected to the transmission member to move the transmission member; and
   a control unit which controls the moving part based on a first mode and a second mode, the first mode in which at least a part of the transmission member is tightened so as to bring a torque transmissive state between the rotor and the transmission member, the second mode in which the transmission member is loosened so as to release the torque transmissive state.

8. A motor device comprising:
a rotor;
a transmission member having a flat surface and wound with respect to at least a portion of the rotor, the transmission member having a substantial winding angle greater than 180°;
a moving part connected to the transmission member to move the transmission member; and
a control unit which controls the moving part based on a first mode and a second mode, the first mode in which at least a part of the transmission member is tightened so as to bring a torque transmissive state between the rotor and the transmission member, the second mode in which the transmission member is loosened so as to release the torque transmissive state.

9. The motor device according to claim 8,
wherein the moving part has an electrostrictive element or a magnetostrictor.

10. The motor device according to claim 8,
wherein the transmission member has a line shape, a belt shape, or a chain shape.

11. The motor device according to claim 8,
wherein the transmission member is formed in an elastically deformable manner.

12. The motor device according to claim 8,
wherein the transmission member includes a conductive material.

13. The motor device according to claim 8,
wherein the rotor has a through-hole passing therethrough in the direction of a rotational axis.

14. The motor device according to claim 8,
wherein the rotor has a groove formed at a circumferential surface thereof.

15. The motor device according to claim 8,
wherein the rotor has a positional deviation suppressing portion that suppresses a positional deviation of the transmission member in the rotational axis.

16. The motor device according to claim 8,
wherein the transmission member is wound around the rotor by at least substantially one rotation.

17. The motor device according to claim 16,
wherein the moving part has a pair of electrostrictive elements or a pair of magnetostrictors provided in positions sandwiching a reference position, and the electrostrictive elements or the pair of magnetostrictors are connected to end portions of the transmission member, respectively.

18. The motor device according to claim 16,
wherein the moving part has a pair of electrostrictive elements or a pair of magnetostrictors provided in positions sandwiching a reference position, and the direction of a force caused by the electrostrictive elements or the pair of magnetostrictors, and the tangential direction of the outer periphery of the rotor at the reference position are made substantially to coincide with each other.

19. The motor device according to claim 8,
wherein a plurality of the transmission members is provided.

20. The motor device according to claim 19,
wherein the moving part is provided in each of the plurality of transmission members, and the plurality of moving parts is arranged at positions which deviate in a rotational direction of the rotor.

21. The motor device according to claim 20,
wherein the rotor has a different diameter in each of the plurality of transmission members.

22. The motor device according to claim 20,
wherein the plurality of moving parts is arranged at positions which deviate at equal angles in the rotational direction of the rotor.

23. The motor device according to claim 8,
wherein the control unit instructs the moving part so as to move the transmission member at a speed faster than the rotating speed of the rotor in a state where the rotor is rotating.

24. The motor device according to claim 8,
wherein the torque transmissive state is a state where a frictional force is generated between the rotor and the transmission member.

25. The motor device according to claim 8,
wherein the rotor is hollow.

26. The motor device according to claim 8,
wherein the rotor has a through portion passing therethrough in the direction of a rotational axis.

27. The motor device according to claim 8, further comprising an encoder.

28. An apparatus comprising:
an arm portion; and
a motor device according to claim 8 that drives the arm portion.

29. The motor device according to claim 8,
wherein, the rotor is driven, and the first mode and the second mode are alternately repeated.

30. The motor device according to claim 8,
wherein, the rotor is driven, and tension is generated in the transmission member.

31. The motor device according to claim 8,
wherein, in the first mode, the transmission member is in contact with the rotor,
and wherein, in the second mode, the transmission member is loosened with respect to the rotor.

32. The motor device according to claim 8,
wherein the moving part has a first part and a second part,
and wherein a direction of a force caused by the first part is in collinear relationship with a direction of a force caused by the second part.

33. The motor device according to claim 8,
wherein the moving part has a pair of parts provided in positions sandwiching a reference position,
and wherein a center axis of the rotor is positioned between the reference position and at least a part of the transmission member.

34. The motor device according to claim 8, wherein the transmission member is a belt.

35. A motor device comprising:
a rotor;
a transmission member having a flat surface and wound with respect to at least a portion of the rotor, the transmission member having a substantial number of turns greater than 0.5;
a moving part connected to the transmission member to move the transmission member; and
a control unit which controls the moving part based on a first mode and a second mode, the first mode in which at least a part of the transmission member is tightened so as to bring a torque transmissive state between the rotor and the transmission member, the second mode in which the transmission member is loosened so at to release the torque transmissive state.

36. A motor device comprising:

a rotor;

a transmission member having a flat surface and wound with respect to at least a portion of the rotor, a moving part connected to the transmission member to move the transmission member; and a control unit which controls the moving part based on a first mode and a second mode, the first mode in which at least a part of the transmission member is tightened so as to bring a torque transmissive state between the rotor and the transmission member, the second mode in which the transmission member is loosened so as to release the torque transmissive state, wherein the moving part has a first part and a second part, and wherein a direction of a force caused by the first part is in collinear relationship with a direction of a force caused by the second part.

37. A motor device comprising:

a rotor having a flat outer surface;

a transmission member having a flat surface and wound with respect to at least a portion of the rotor, the transmission member or lines which extend from ends of the transmission member, having a substantially intersecting portion;

a moving part connected to the transmission member to move the transmission member; and a control unit which controls the moving part based on a first mode and a second mode, the first mode in which at least a part of the transmission member is tightened so as to be in contact with the flat outer surface and to produce a torque transmissive state between the rotor and the transmission member, the second mode in which the transmission member is loosened so as to release the torque transmissive state.

38. A motor device comprising:

a rotor having a generally flat circumferential surface;

a transmission member having a flat surface and wound with respect to at least a portion of the rotor, the transmission member or lines which extend from ends of the transmission member, having a substantially intersecting portion;

a moving part connected to the transmission member to move the transmission member; and a control unit which controls the moving part based on a first mode and a second mode, the first mode in which at least a part of the transmission member is tightened so as to produce a torque transmissive state between the rotor and the transmission member, the second mode in which the transmission member is loosened so as to release the torque transmissive state.

39. A motor device comprising:

a rotor;

a transmission member having a flat surface and wound with respect to at least a portion of the rotor, the transmission member or lines which extend from ends of the transmission member, having a substantially intersecting portion;

a moving part connected to the transmission member to move the transmission member; and a control unit which controls the moving part based on a first mode and a second mode, the first mode in which at least a part of the transmission member is tightened so that the flat surface of the transmission member is in contact with the rotor and that a torque transmissive state is produced between the rotor and the transmission member, the second mode in which the transmission member is loosened so as to release the torque transmissive state.

40. The motor device according to claim 39, further comprising an encoder.

41. An apparatus comprising:

an arm portion; and a motor device according to claim 39 that drives the arm portion.

42. A motor device comprising:

a rotor having a flat circumferential surface;

a transmission member having a flat surface and wound with respect to at least a portion of the rotor, the transmission member or lines which extend from ends of the transmission member, having a substantially intersecting portion;

a moving part connected to the transmission member to move the transmission member; and a control unit which controls the moving part based on a first mode and a second mode, the first mode in which at least a part of the transmission member is tightened so that the flat surface of the transmission member is in contact with the flat circumferential surface of the rotor and that a torque transmissive state is produced between the rotor and the transmission member, the second mode in which the transmission member is loosened so as to release the torque transmissive state.

43. A motor device comprising:

a rotor;

a transmission member having a flat surface and wound with respect to at least a portion of the rotor, the transmission member or lines which extend from ends of the transmission member, having a substantially intersecting portion;

a moving part connected to the transmission member to move the transmission member; and a control unit which controls the moving part based on a first mode and a second mode, the first mode in which at least a part of the transmission member is tightened so that the transmission member is in contact with the rotor and that a torque transmissive state is produced between the rotor and the transmission member for driving the rotor in a predetermined rotational direction, the second mode in which the transmission member is loosened with respect to the rotor, which is rotating in the predetermined rotational direction, so as to release the torque transmissive state.

44. The motor device according to claim 43, wherein the control unit repeats the first mode and the second mode while the rotor is rotating in the predetermined rotational direction.

45. The motor device according to claim 43, wherein the control unit repeats the first mode and the second mode while the rotor is rotating in the predetermined rotational direction so as to transmits a torque to the rotor from the transmission member.

46. The motor device according to claim 43, wherein, in a repeat of the first mode and the second mode, the rotor having a surface is continuously rotated in the predetermined rotational direction with frictional force between the surface of the rotor and the transmission member.

47. A motor device comprising:

a rotor;

a transmission member wound with respect to at least a portion of the rotor, the transmission member having an opened structure, the opened structure having two open ends arranged such that lines which extend from the two open ends will intersect;

a moving part connected to the transmission member to move the transmission member; and a control unit which controls the moving part based on a first mode and a second mode, the first mode in which at least a part of the transmission member is tightened so as to produce a torque transmissive state between the rotor and the transmission member, the second mode in which the transmission member is loosened so as to release the torque transmissive state.

48. The motor device according to claim 47, further comprising an encoder.

49. An apparatus comprising:

an arm portion; and a motor device according to claim 47 that drives the arm portion.

\* \* \* \* \*